(12) United States Patent
Sugimoto et al.

(10) Patent No.: US 11,914,603 B2
(45) Date of Patent: Feb. 27, 2024

(54) DATA LAYOUT MODEL GENERATION SYSTEM

(71) Applicant: Hitachi, Ltd., Tokyo (JP)

(72) Inventors: Ken Sugimoto, Tokyo (JP); Norifumi Nishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/860,237

(22) Filed: Jul. 8, 2022

(65) Prior Publication Data

US 2023/0018978 A1 Jan. 19, 2023

(30) Foreign Application Priority Data

Jul. 15, 2021 (JP) ................................ 2021-117480

(51) Int. Cl.
*G06F 16/00* (2019.01)
*G06F 16/2458* (2019.01)
*G06F 16/22* (2019.01)

(52) U.S. Cl.
CPC ...... *G06F 16/2471* (2019.01); *G06F 16/2255* (2019.01); *G06F 16/2272* (2019.01)

(58) Field of Classification Search
None
See application file for complete search history.

(56) References Cited

U.S. PATENT DOCUMENTS

| | | | |
|---|---|---|---|
| 8,326,825 B2* | 12/2012 | Nehme | G06F 16/24532 707/719 |
| 10,963,810 B2* | 3/2021 | Dirac | G06N 20/00 |
| 2015/0213072 A1* | 7/2015 | Chen | G06F 16/278 707/693 |
| 2020/0219028 A1* | 7/2020 | Papaemmanouil | G06Q 10/06375 |

OTHER PUBLICATIONS

Leis et al., "How Good Are Query Optimizers, Really?", PVLDB, 2015, pp. 204-215, vol. 9, No. 3, (12 pages).

* cited by examiner

*Primary Examiner* — Anhtai V Tran
(74) *Attorney, Agent, or Firm* — Crowell & Moring LLP

(57) ABSTRACT

A data layout model generation system generates, with reinforcement learning, a node configuration and a data layout key in a distributed parallel database. This system includes a sample acquisition processor that acquires, on the basis of a predetermined acquisition method, sample data from data stored in the distributed parallel database, a data layout estimator having, as states in the reinforcement learning, the node configuration and the data layout key including information regarding an order of sorting columns that constitute the data and information regarding a method for distribution between nodes, the data layout estimator estimating layout of the data on the basis of the state and the sample data, a reward calculator that calculates a reward in the reinforcement learning on the basis of a result obtained by estimating the layout of the data, the node configuration, and a processing cost of a query executed on the distributed parallel database.

10 Claims, 24 Drawing Sheets

FIG. 6

NUMBER OF EPISODES

105

| NUMBER OF TIMES | 1000 |
|---|---|

FIG. 7

QUERY INFORMATION

106

| NUMBER | QUERY | EXECUTION RATE |
|---|---|---|
| 1 | select c_id from customer where c_id < 10 | 0.4 |
| 2 | select o_name from order where o_id > 20 | 0.6 |

FIG. 8

SAMPLE ACQUISITION METHOD

107

| METHOD | RATE | MINIMUM NUMBER |
|---|---|---|
| RANDOM | 0.01 | 1000 |

FIG. 9

NODE CONFIGURATION

202 →

| TYPE | QUANTITY |
|---|---|
| small | 4 |

FIG. 10

DATA LAYOUT KEY

203 →

| TABLE NAME | SORT KEY | DISTRIBUTION KEY |
|---|---|---|
| customer | c_id, c_name | c_region |
| order | | all |

FIG. 12

REWARD                    2013

| REWARD | 2.34 |
|--------|------|

NODE CONFIGURATION

| TYPE  | ADDITION |
|-------|----------|
| small | 0        |
| large | 0        |

DATA LAYOUT KEY

| TABLE NAME | SORT KEY | DISTRIBUTION KEY |
|------------|----------|------------------|
| customer   |          |                  |
| order      | o_name   |                  |

DATA LAYOUT MODEL GENERATION SYSTEM

BACKGROUND OF THE INVENTION

1. Field of the Invention

The present invention relates to a technique for generating a machine learning model that automatically calculates an appropriate data layout between nodes in a database system, particularly a distributed parallel database system.

2. Description of the Related Art

As an amount of data handled in a database increases, need for a distributed parallel database is increasing. The distributed parallel database holds data in a plurality of nodes in a distributed manner, and each node processes the data. In this system, physical data layout design between nodes is very important. In particular, it is known that execution speed of a query greatly varies depending on which data on which table is laid out in which node in what form. Specifically, design is performed such that data to be joined is laid out in the same node, data is sorted in advance according to a filter condition, or the like. That is, because rich knowledge of a database is required for physical layout design of data, a database administrator often performs the design. However, a physical data layout by a database administrator is also becoming difficult due to an increase in the number of queries and the number of tables, an increase in an amount of data to be handled, difference in optimum data layout for each query, or the like. Therefore, a technique for supporting physical data layout design by a system is required. If the physical data layout can be appropriately performed, target performance can be achieved by a smaller quantity of nodes, and cost performance can be improved.

SUMMARY OF THE INVENTION

In U.S. Pat. No. 8,326,825 B2, a system extracts an optimum candidate regarding which data is laid out in which node. However, in the patent, all possible physical data layouts in nodes are enumerated, and a full search is performed by using a branch and bound method to derive an optimum physical data layout. Therefore, in order to select an optimum configuration from among a plurality of types of node configurations, it is necessary to select all the node configurations as candidates and perform identical processing on each of the candidates. Meanwhile, considering which cloud service is used and the like, several hundred to several thousand patterns of node configuration candidates are conceivable. Therefore, very long processing time is required. In addition, because there are many possible physical data layouts, a query cost is predicted at high speed by using a query optimizer. That is, in this known example, a data layout predicted by the query optimizer to be optimum is derived. Meanwhile, as "V. Leis, A. Gubichev, A. Mirchev, P. Boncz, A. Kemper, and T. Neumann. How good are query optimizers, really? PVLDB, 9(3), 2015" indicates, it is known that performance of query cost prediction by a query optimizer is not high, and thus, an optimum physical data layout is not necessarily obtained with the method.

An object of the present invention is to provide a technique capable of obtaining a physical data layout that is more appropriate than in the past.

A data layout model generation system according to an aspect of the present invention generates, with reinforcement learning, a node configuration and a data layout key in a distributed parallel database, the data layout model generation system including a sample acquisition processor that acquires, on the basis of a predetermined acquisition method sample data from data stored in the distributed parallel database, a data layout estimator having, as states in the reinforcement learning, the node configuration and the data layout key including information regarding an order of sorting columns that constitute the data and information regarding a method for distribution between nodes, the data layout estimator estimating layout of the data on the basis of the state and the sample data, a reward calculator that calculates a reward in the reinforcement learning on the basis of a result obtained by estimating the layout of the data, the node configuration, and a processing cost of a query executed on the distributed parallel database, a reinforcement learner that outputs, according to the calculated reward, the node configuration and the data layout key that are subjected to reinforcement learning as an action, and a state updater that updates, as a new state, the node configuration and the data layout key that are output as the action.

Furthermore, a data layout model generation system according to an aspect of the present invention generates, with reinforcement learning, a node configuration and a data layout key in a distributed parallel database, the data layout model generation system including a data distribution acquirer that acquires, on the basis of data stored in the distributed parallel database and a query executed on the distributed parallel database, data distribution of each table and data distribution of tables joined by the query, a data layout estimator having, as states in the reinforcement learning, the node configuration and the data layout key including information regarding an order of sorting columns that constitute the data and information regarding a method for distribution between nodes, the data layout estimator estimating layout of the data on the basis of the state and the data distribution, a reward calculator that calculates a reward in the reinforcement learning on the basis of a result obtained by estimating the layout of the data, the node configuration, and a processing cost of a query executed on the distributed parallel database, a reinforcement learner that outputs, according to the calculated reward, the node configuration and the data layout key that are subjected to reinforcement learning as an action, and a state updater that updates, as a new state, the node configuration and the data layout key that are output as the action.

According to the present invention, it is possible to obtain a physical data layout that is more appropriate than in the past.

BRIEF DESCRIPTION OF THE DRAWINGS

FIG. 6 illustrates the number of episodes;

FIG. 7 illustrates query information;

FIG. 8 illustrates a sample acquisition method;

FIG. 9 illustrates a node configuration;

FIG. 10 illustrates data layout keys;

FIG. 12 illustrates a reward;

FIG. 13 illustrates an action;

DESCRIPTION OF THE PREFERRED EMBODIMENTS

Figure 1:
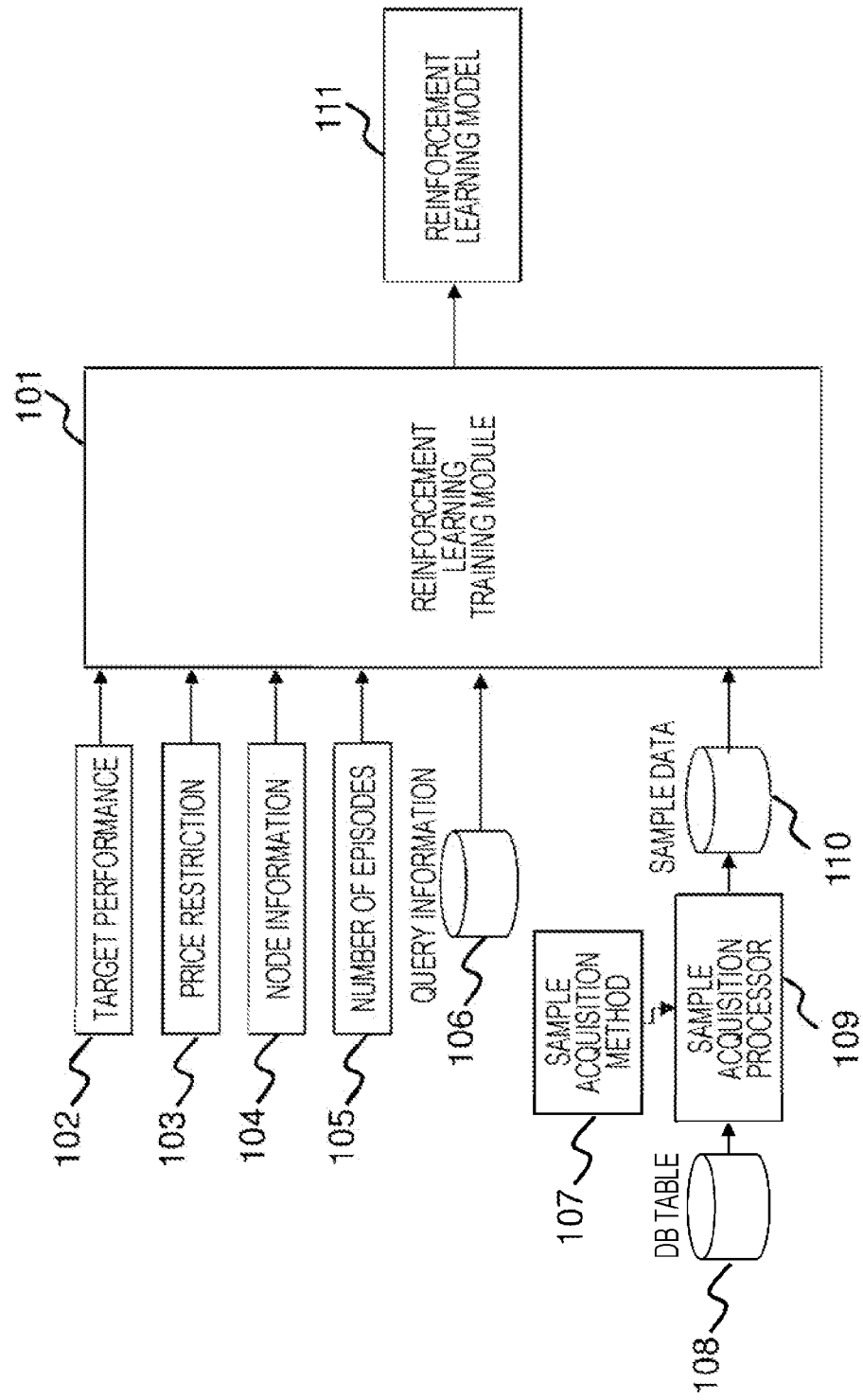
FIG. 1 is an overall configuration diagram of a model training configuration of a reinforcement learning system according to a first embodiment.

Hereinafter, preferred embodiments of the present invention will be described with reference to the drawings. The following description and drawings are exemplified for describing the present invention, and are partially omitted and simplified as appropriate for clear description. The present invention can be carried out in various other forms. Unless otherwise specified, each component may be singular or plural.

A position, size, shape, range, or the like of each component illustrated in the drawings may not represent an actual position, size, shape, range, or the like to facilitate understanding of the invention. Therefore, positions, sizes, shapes, ranges, and the like of components according to the present invention are not necessarily limited to those disclosed in the drawings.

In the following description, various types of information may be described with expressions such as a "database", a "table", and a "list". However, the various types of information may be expressed with a data structure other than these. An "XX table", an "XX list", or the like may be referred to as "XX information" to indicate being independent of a data structure. "Identification information", "identifier", "name", "ID", and "number" used in description of identification information can be replaced with one another.

The same reference numerals for a plurality of components having the same or similar functions may be provided with different characters for description. However, the different characters may be omitted in a case where the plurality of components does not particularly need to be distinguished.

Processing performed by executing a program may be described below. In that case, the processing may be performed by a processor, because the program is executed by the processor (for example, a central processing unit (CPU) or a graphics processing unit (GPU)) to perform predetermined processing by using a storage resource (for example, a memory) and/or an interface device (for example, a communication port) as appropriate. Similarly, the processing performed by executing the program may be conducted by a controller, a device, a system, a computer, or a node having a processor. The processing performed by executing the program is only required to be conducted by an arithmetic unit, which may include a dedicated circuit (for example, a field-programmable gate array (FPGA) or an application specific integrated circuit (ASIC)) that performs specific processing.

The program may be installed in a device, such as a computer, from a program source. The program source may be, for example, a program distribution server or a computer-readable storage medium. In a case where the program source is a program distribution server, the program distribution server may include a processor and a storage resource that stores a distribution target program, and the processor of the program distribution server may distribute the distribution target program to another computer. In the following description, two or more programs may be implemented as one program, or one program may be implemented as two or more programs.

Figure 32:
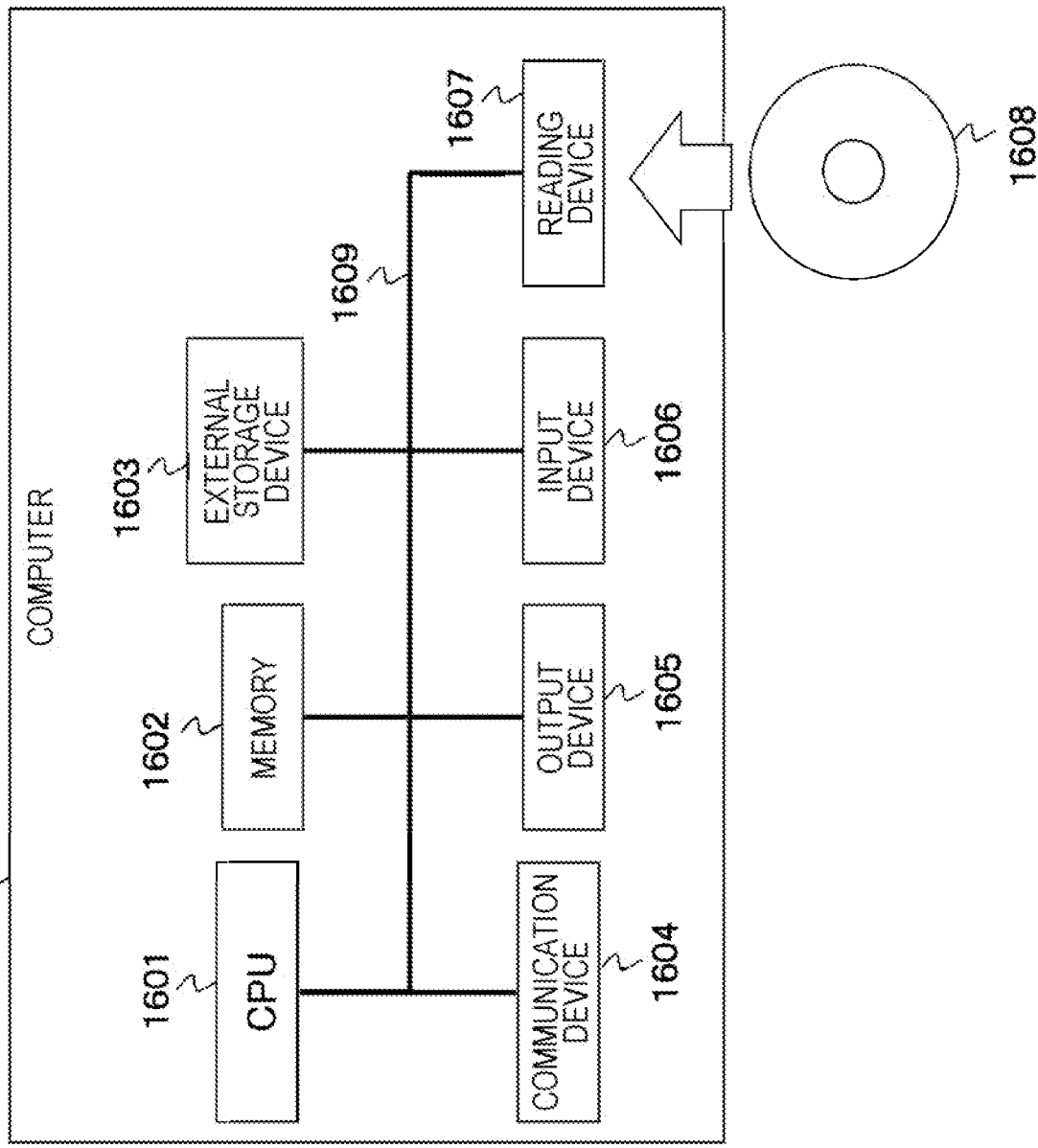
FIG. 32 is a diagram illustrating an example of a schematic configuration of a computer.

Functions and processing in the following embodiments can be achieved by, as illustrated in FIG. 32 (computer schematic diagram) for example, a general computer 1600 including, a CPU 1601, a memory 1602, an external storage device 1603 such as a hard disk drive (HDD), a reading device 1607 that reads/writes information from/to a portable storage medium 1608 such as a compact disk (CD) or a USB memory, an input device 1606 such as a keyboard or a mouse, an output device 1605 such as a display, a communication device 1604 such as a network interface card (NIC) for connection to a communication network, and an internal communication line (referred to as a system bus) 1609 such as a system bus connecting these.

Various data stored in this system or used for processing can be implemented by the CPU 1601 reading the data from the memory 1602 or the external storage device 1603 and using the data. In addition, each of functional units (for example, a reinforcement learning training module 101, a reinforcement learning estimation module 201, and a sample acquisition processor 109) included in this system can be implemented by the CPU 1601 loading a predetermined program stored in the external storage device 1603 into the memory 1602 and executing the program.

The predetermined program described above may be stored (downloaded) in the external storage device 1603 from the storage medium 1608 via the reading device 1607 or from a network via the communication device 1604, loaded into the memory 1602, and then executed by the CPU 1601. Furthermore, the program may be directly loaded into the memory 1602 from the storage medium 1608 via the reading device 1607 or from the network via the communication device 1604, and then executed by the CPU 1601.

Hereinafter, a case where this system is configured by a certain computer will be exemplified. However, all or a part of these functions may be distributed to one or a plurality of computers such as a cloud, and similar functions may be implemented by communication with each other via a network.

First Embodiment

Hereinafter, a physical data layout, and a data layout model generation system serving as a node configuration automatic optimization system according to a first embodiment will be described with reference to FIGS. 1 to 24. The data layout model generation system is a system for automatically calculating an appropriate data layout between nodes in a distributed parallel database system. In the first embodiment, first, the reinforcement learning system trains a machine learning model on the basis of inputs of target performance, a price restriction, node information, query information, a database, and the like. Thereafter, an optimum physical data layout and node configuration are estimated by using the created reinforcement learning model.

FIG. 1 is an overall configuration diagram of model training processing at a time of training according to the first embodiment. The reinforcement learning training module 101 receives a target performance 102, a price restriction 103, node information 104, the number of episodes 105, query information 106, and sample data 110 as input, and outputs a reinforcement learning model 111. The sample data 110 is calculated by the sample acquisition processor 109 performing processing by using a sample acquisition method 107 from a DB table 108.

Figure 2:
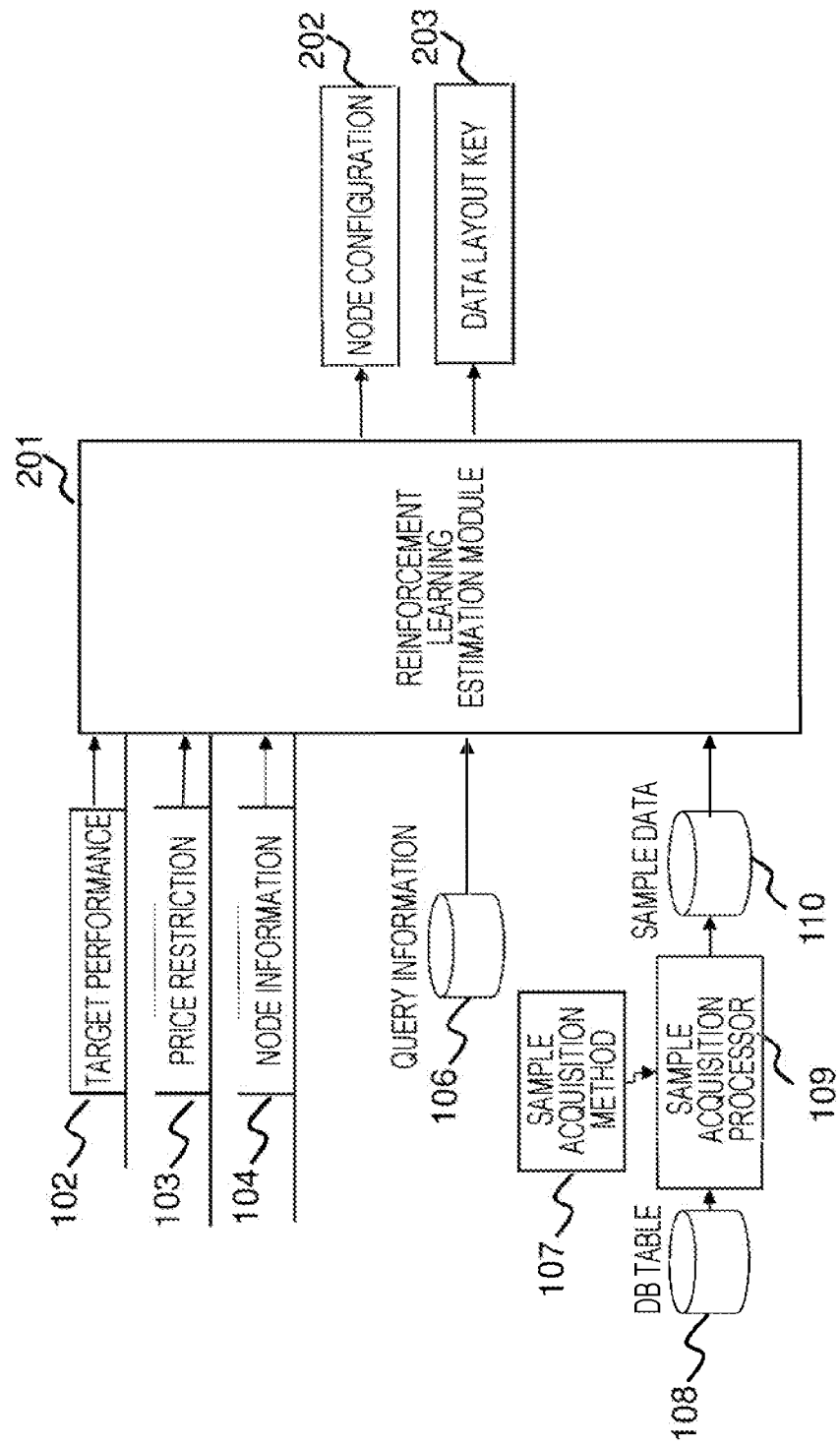
FIG. 2 is an overall configuration diagram of an estimation configuration of the reinforcement learning system according to the first embodiment.

FIG. 2 is an overall configuration diagram of estimation processing according to the first embodiment. This system uses common input substantially similar to input in the system at a time of reinforcement learning training illustrated in FIG. 1. That is, the reinforcement learning estimation module 201 receives the target performance 102, the price restriction 103, the node information 104, the query information 106, and the sample data 110 as input. The sample data 110 is calculated by the sample acquisition processor 109 performing processing by using the sample acquisition method 107 from the DB table 108. Furthermore, the reinforcement learning estimation module 201 outputs a node configuration 202 and a data layout key 203. The node configuration 202 is configuration information of nodes that constitute the distributed parallel database system. The data layout key 203 is key information for calculating an appropriate data layout between nodes in the distributed parallel database system.

Figure 3:
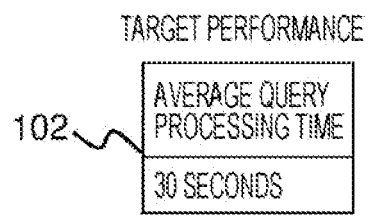
FIG. 3 illustrates target performance.

FIG. 3 illustrates an example of the target performance 102. In FIG. 3, target performance of the distributed parallel database includes average query execution time.

Figure 4:
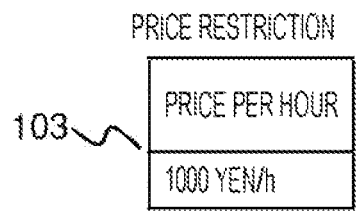
FIG. 4 illustrates a price restriction.

FIG. 4 illustrates an example of the price restriction 103. In FIG. 4, a node price restriction includes a price per hour.

Figure 5:
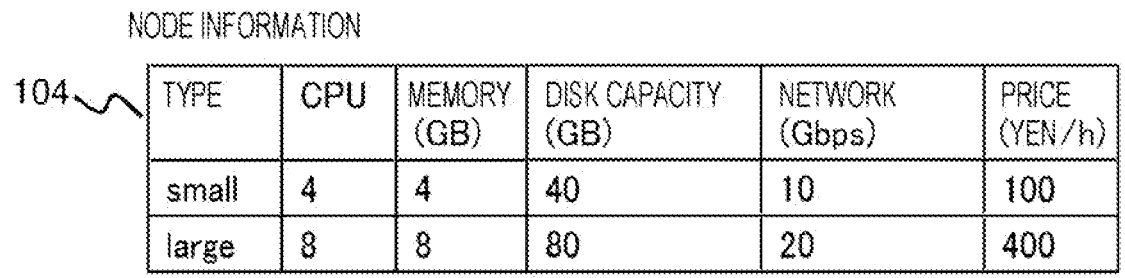
FIG. 5 illustrates node information.

FIG. 5 illustrates an example of the node information 104. In FIG. 5, the node information includes a list of node types and the number of CPUs, memory capacity, disk capacity, network bandwidth, and price for each type. This information is used when estimating time required for execution of each query or when estimating a price according to a node configuration.

FIG. 6 illustrates an example of the number of episodes 105. The number of episodes 105 means the number of repetitions of episodes during reinforcement learning.

FIG. 7 illustrates an example of the query information 106. The query information 106 is information regarding a query executed on the distributed parallel database system. The query information 106 includes query numbers, and specific query content for each number and an execution rate of the query to a whole. As the query information 106, a query execution log can be used instead. In this case, an execution query type and the query execution rate are calculated on the basis of a query log. Basically, it is considered to be preferable to use the query information 106 at a time of a system construction during which a query log does not exist, and to use a query log a time of system operation during which the query log exists.

FIG. 8 illustrates a sample acquisition method 107. The sample acquisition method 107 includes elements of a sampling method, a sampling rate, and a minimum number. The sampling method indicates a method for acquiring table sample data. For example, a method for randomly acquiring data is conceivable. The rate is a sample number acquisition rate, and the minimum number is the minimum number of data to be acquired. In other words, in a case where Number of data*Rate>Minimum number, data of Number of data*Number of rates is extracted, and in a case where Number of data*Rate<Minimum number, data of the minimum number is extracted.

FIG. 9 illustrates an example of the node configuration 202, and FIG. 10 illustrates an example of the data layout key 203. The node configuration 202 and the data layout key 203 are output from the reinforcement learning estimation module 201 and also are internal states of the reinforcement learning training module 101 and the reinforcement learning estimation module 201.

The node configuration 202 includes type and quantity. The type indicates a type listed in the node information 104 illustrated in FIG. 5. That is, the node configuration 202 indicates how many and which type of nodes are connected to constitute the distributed parallel database system.

The data layout key 203 includes a sort key and distribution key for each table. The sort key indicates which column each table indicates sorting based on. The sort key can be represented by an ordered list of column names of the table. For example, when a "customer" table has three columns of c_id, c_name, and c_region, a list of c_id, c_name can be set as a sort key. In this case, it means that data of the "customer" table is first sorted by c_id, and is further sorted by c_name and saved on each node. As a result, for example, in a case where filtering is performed by a partial region of c_name, it is not necessary to read all data, and thus, a query can be executed at high speed. A blank sort key means that the table is not sorted by a specific key.

The distribution key has one column name or "all" element of each table. In a case where a column name is set for the distribution key, for example, a hash of a value of the column is acquired, and a node to be laid out is determined according to the hash value. In a case where the distribution key is c_region, a hash of c_region is obtained, and a node to be laid out for each column can be determined according to the hash value. In a case where the nodes can be distributed by the same join key, the tables can be joined without transferring data between the nodes, and processing performance in the distributed parallel database can be improved. In a case where the distribution key is "all", the table is laid out in all the nodes. In particular, in a case where the table is small in size, only by a small increase in disk capacity, it is possible to reduce network load when joining tables by laying out the table in all nodes. In a case where the distribution key is blank, each column is laid out in a round robin manner, for example. As a result, the data of the table can be evenly distributed to all the nodes, and query processing load for each node can be distributed among the nodes.

Figure 11:
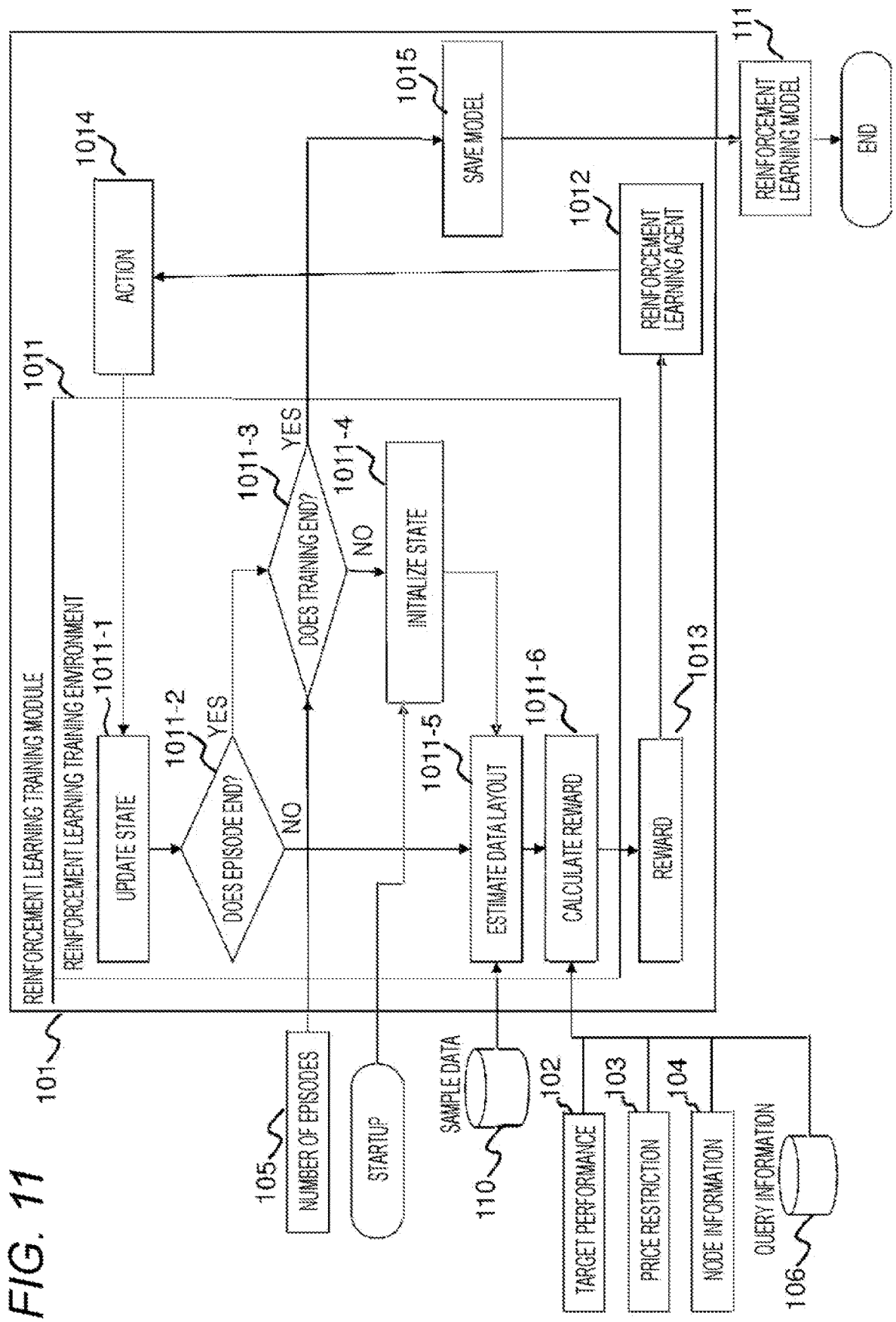
FIG. 11 is an overall processing flowchart at a time of model training in the first embodiment.

FIG. 11 is an overall processing flowchart of the reinforcement learning training module 101. The reinforcement learning training module 101 includes a reinforcement learning training environment 1011 and a reinforcement learning agent 1012. The reinforcement learning training environment 1011 internally has a state and calculates a reward 1013 according to the state. The state includes a node configuration 202 and data layout keys 203 (The node configuration 202 and the data layout keys 203 illustrated in FIG. 2 are obtained by outputting this state to outside.). The reward 1013 is input to the reinforcement learning agent 1012, and the reinforcement learning agent 1012 calculates an action 1014. The action 1014 is input to the reinforcement learning training environment 1011, and the reinforcement learning training environment 1011 updates the internal state according to the input action 1014 and newly calculates the reward 1013. As the reinforcement learning agent 1012, a general reinforcement learning module can be utilized. For example, it is conceivable to use proximal policy optimization algorithms (PPO), asynchronous advantage actor-critic (A3C), or trust region policy optimization (TRPO).

Detailed operation of the reinforcement learning training environment 1011 is as follows. First, upon receiving action 1014, the state is internally updated (1011-1). Then, it is determined whether to end an episode of the reinforcement learning (1011-2). In a case where it is determined to end the episode (1011-2: Yes), next, it is determined whether to end the training (1011-3). In a case where it is determined to end the training (1011-3: Yes), processing of saving a current model is performed (1015), and the reinforcement learning model 111 is output. This model saving processing corresponds to a method for machine learning and is performed with the method included in a machine learning library. In a case where it is determined not to end the training (1011-3: No), the state initialization is performed (1011-4). Then, next, joining the case where it is determined not to end the episode in the episode end determination (1011-2: No), data layout estimation processing is performed (1011-5). This processing is performed by using the sample data 110. Then, a reward of the query is calculated on the basis of the node configuration 202 or the data layout key 203 that are internal states (1011-6), and the reward 1013 is output. Note that, when starting the reinforcement learning, the processing from the state initialization 1011-4 is started.

FIG. 12 illustrates an example of a reward 2013. The reward is an evaluation value for the node configuration 202 and data layout key 203 that are calculated from the query processing load (processing cost) and from a node price.

FIG. 13 illustrates an example of an action 2014. The action indicates a change in an internal state of the reinforcement learning training module 101 or the reinforcement learning estimation module 201. The action indicates which type of the node configuration is added and for which table the sort key or the distribution key is set. The action can change only in a part of the state.

Figure 14:
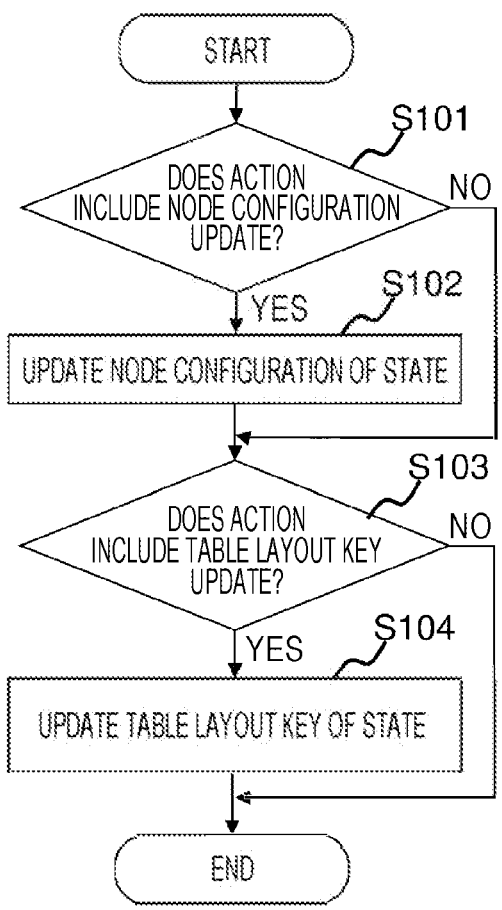
FIG. 14 illustrates state update processing.

FIG. 14 illustrates an example of a state update (1011-1) processing. First, the reinforcement learning training environment 1011 determines whether the update information of the node configuration is included in the action (S101). In a case where the update information is included (S101: Yes), the node configuration of the state is updated (S102). For example, in a case of an action of increasing a "small" type node by one, the "small" type node is increased by one in the node configuration. Next, it is determined whether the action includes an update of a table layout key (S103). In a case where the update of the table layout key is included (S103: Yes), a table layout key of the state is updated. In a case where an update of the sort key is included, the sort key is added to an end of the sort key of the state. In a case where an update of the distribution key is included, the action is ignored in a case where a distribution key is already set for the state. In a case where the distribution key is not set, the distribution key is set to the state.

Figure 15:
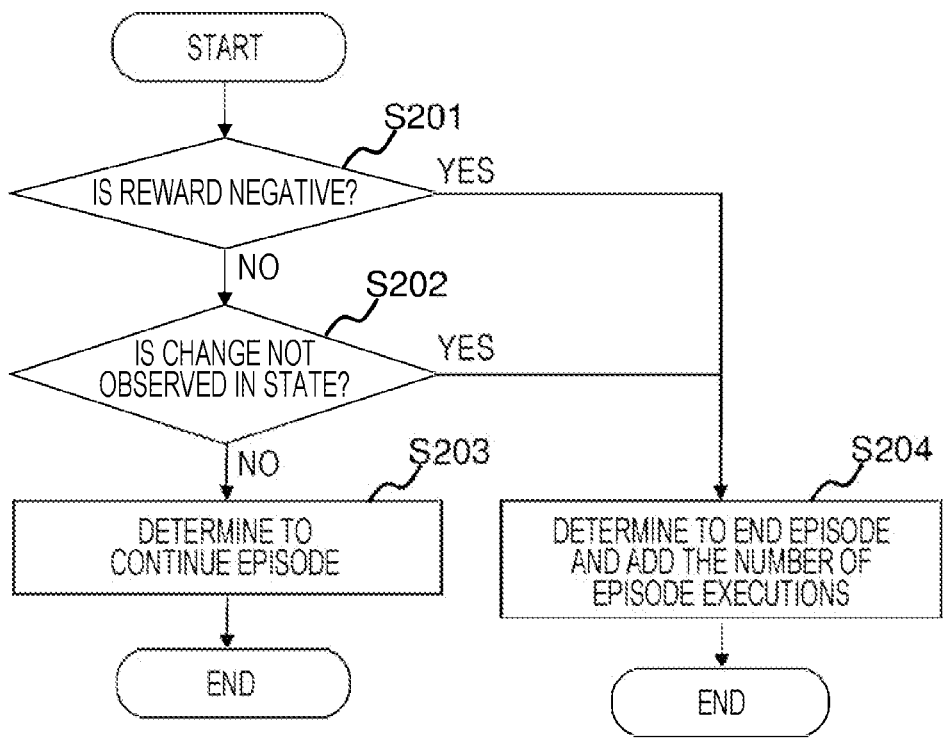
FIG. 15 illustrates episode end determination processing.

FIG. 15 illustrates an example of the episode end determination (1012-2) processing. First, the reinforcement learning training environment 1011 acquires a previous reward 1013 and determines whether the reward 1013 is negative (S201). In a case of negative (S201: Yes), it is determined to end the episode, and the number of episode executions is added (S204). The number of episode executions is a value indicating what number the current episode is, the value being included in the reinforcement learning training environment. This value is initialized to 0 only once at a start of training. In a case where the reward 1013 is 0 or more, next, it is determined whether a change is observed in the state, as compared with a previous time (S202). In a case where a change is not observed in the state (S202: Yes), it is determined to end the episode, and the number of episode executions is added (S204). In a case where a change is observed in the state (S202: No), it is determined to continue the episode (S203).

Figure 16:
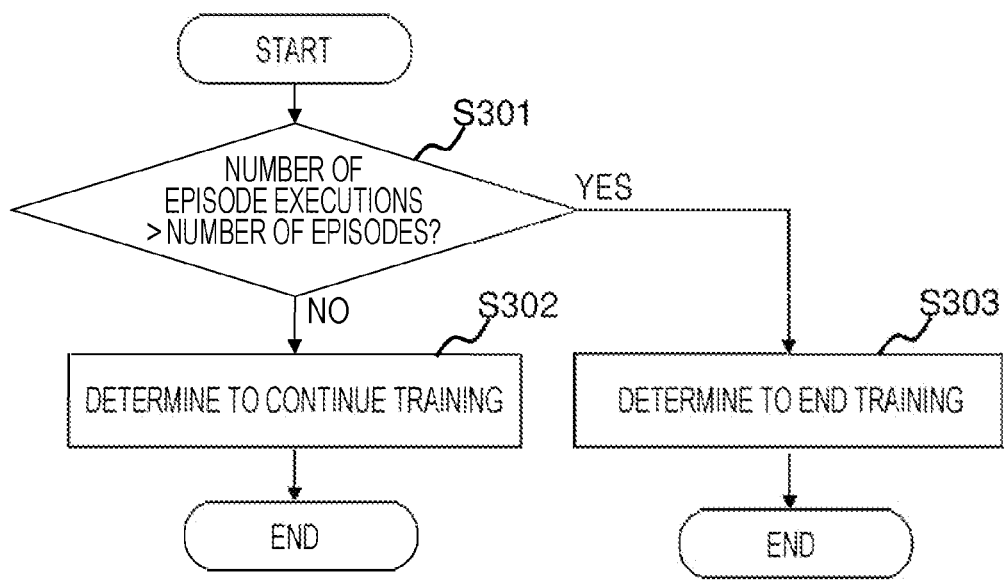
FIG. 16 illustrates training end determination processing.

FIG. 16 illustrates an example of training end determination (1013-3) processing. In this processing, the reinforcement learning training environment 1011 determines whether the number of episode executions is larger than the number of episodes 105 (S103). In a case where the number of episode executions is smaller than the number of episodes 105 (S103: No) It is determined to continue the training (S302). In a case where the number of episode executions is larger than the number of episodes 105 (S103: Yes), it is determined to end the training processing (S303).

Figure 17:
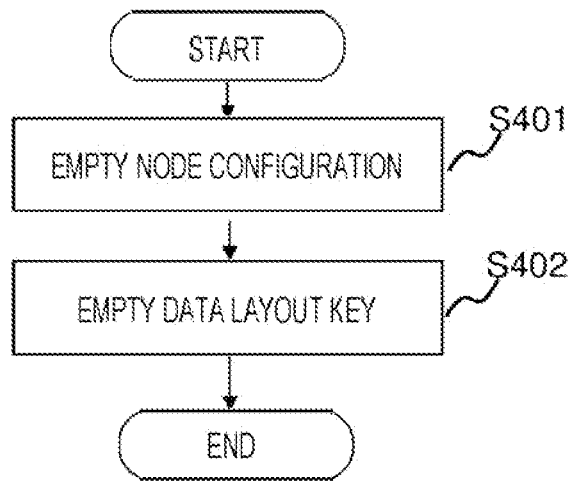
FIG. 17 illustrates state initialization processing.

FIG. 17 illustrates an example of a state initialization (1011-4) processing. In this processing, the reinforcement learning training environment 1011 first empties the node configuration that is a state (S401), and also empties the data layout keys (S402). For the data layout keys, the sort key and the distribution key of all the tables are emptied.

Figure 18:
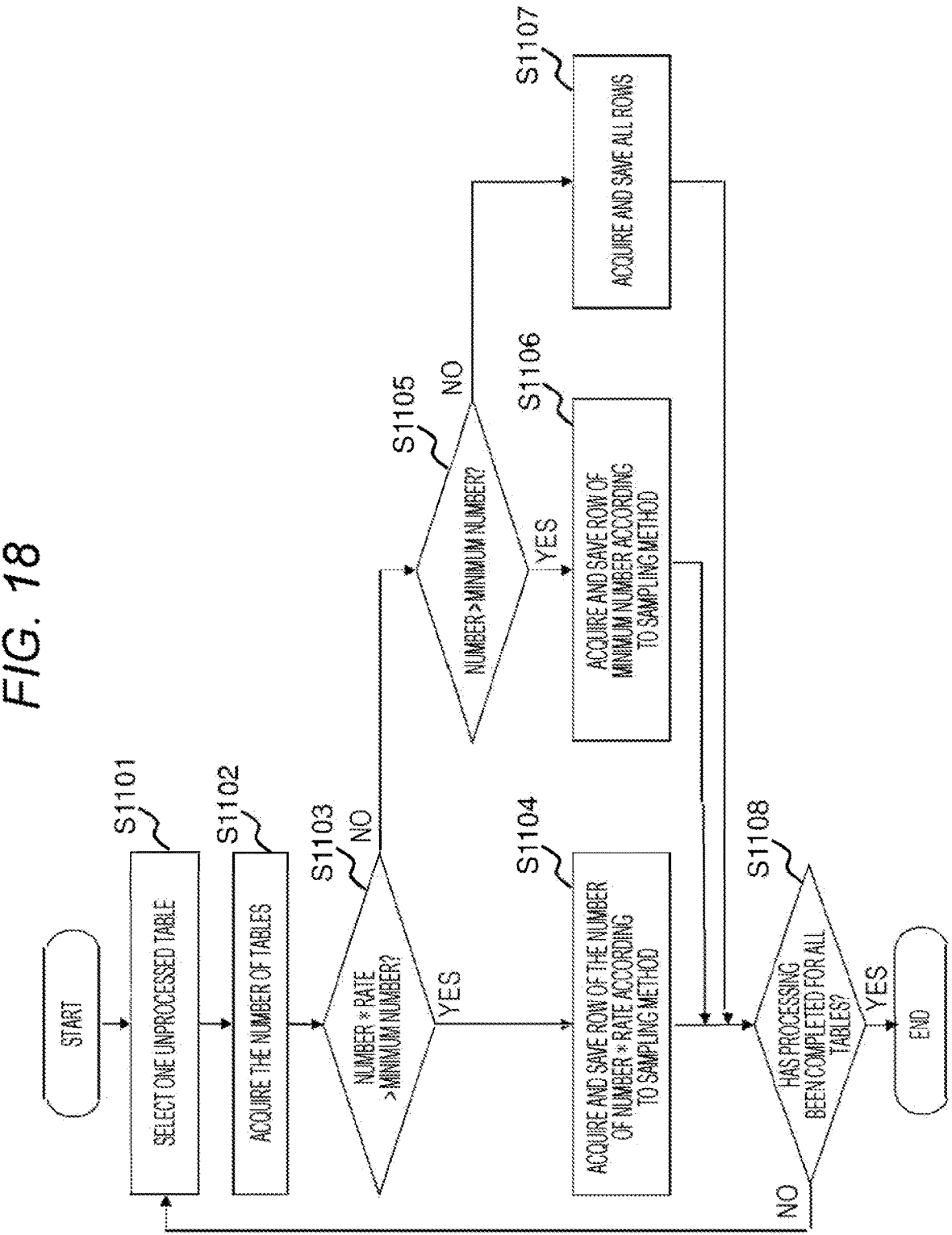
FIG. 18 illustrates sample data acquisition processing.

FIG. 18 is a flowchart illustrating processing performed by a sample acquisition processor 109. The sample data 110 is used as an input to data layout estimation 1011-5. This sampling processing S1101 to S1108 is processing performed on all the tables one by one. Therefore, first, the sample acquisition processor 109 selects one unprocessed table (S1101). Next, the number of tables is acquired (S1102). At this time, the rate and the minimum number are acquired by the sample acquisition method 107. Then, it is determined whether Number*Rate>Minimum number (S1103). In a case where Number*Rate>Minimum number (S1103: Yes), a row of the number of Number * Number of rates is acquired and saved according to the sampling method illustrated in the sample acquisition method 107 (S1104). In a case where Number*Rate<Minimum number (S1103: No), whether Number>Minimum number is determined (S1105). In a case where Number>Minimum number (S1105: Yes), a row of Minimum number is acquired and saved according to the sampling method illustrated in the sample acquisition method 107 (S1106). In a case where Number<Minimum number (S1105: No), all rows are acquired and saved according to the sampling method illustrated in the sample acquisition method 107 (S1107). Thereafter, it is determined whether the processing has been completed for all the tables (S1108), and in a case where there is an unprocessed table (S1108: No), the processing from S1101 is performed again.

Figure 19:
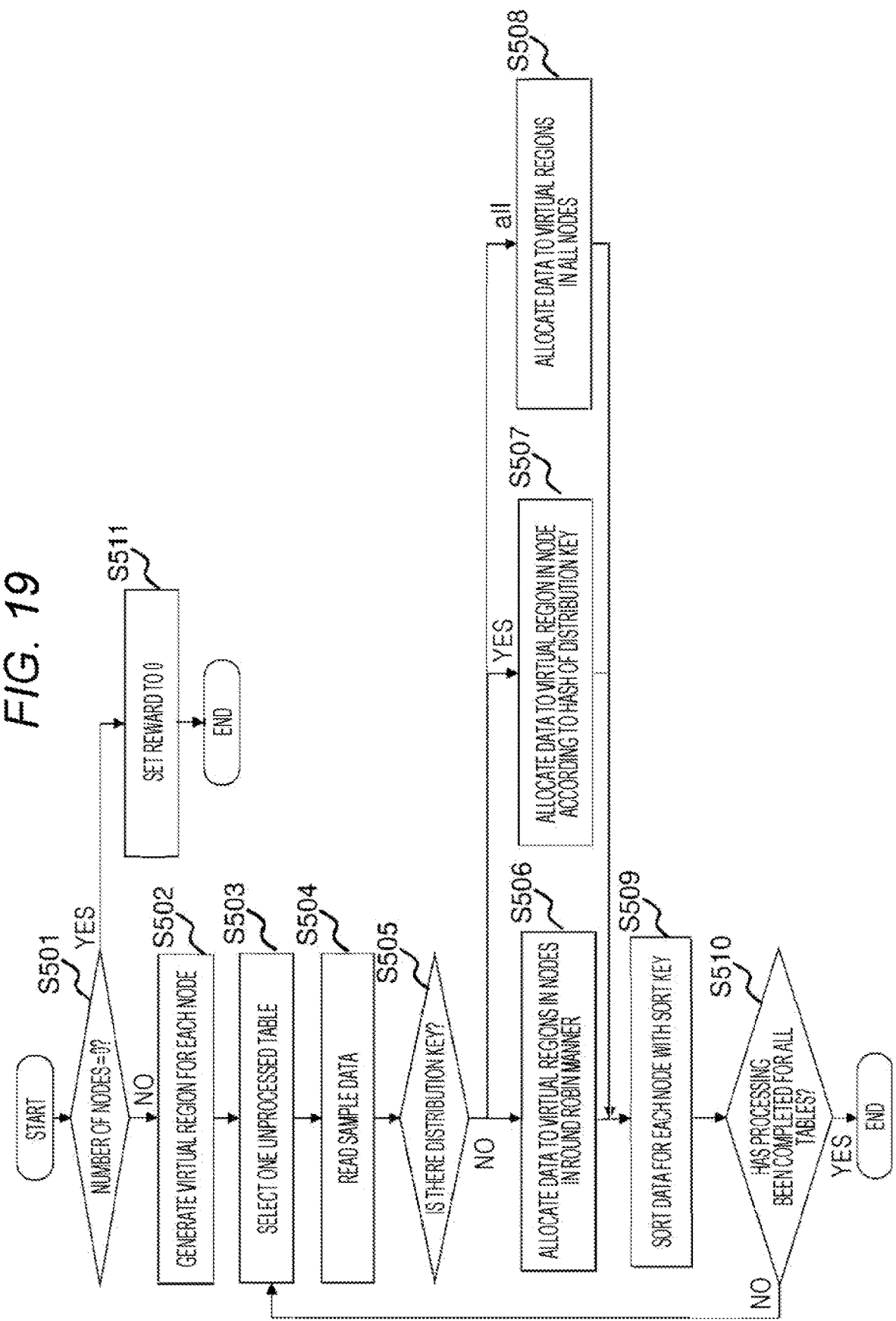
FIG. 19 illustrates data layout estimation processing.
Figure 20:
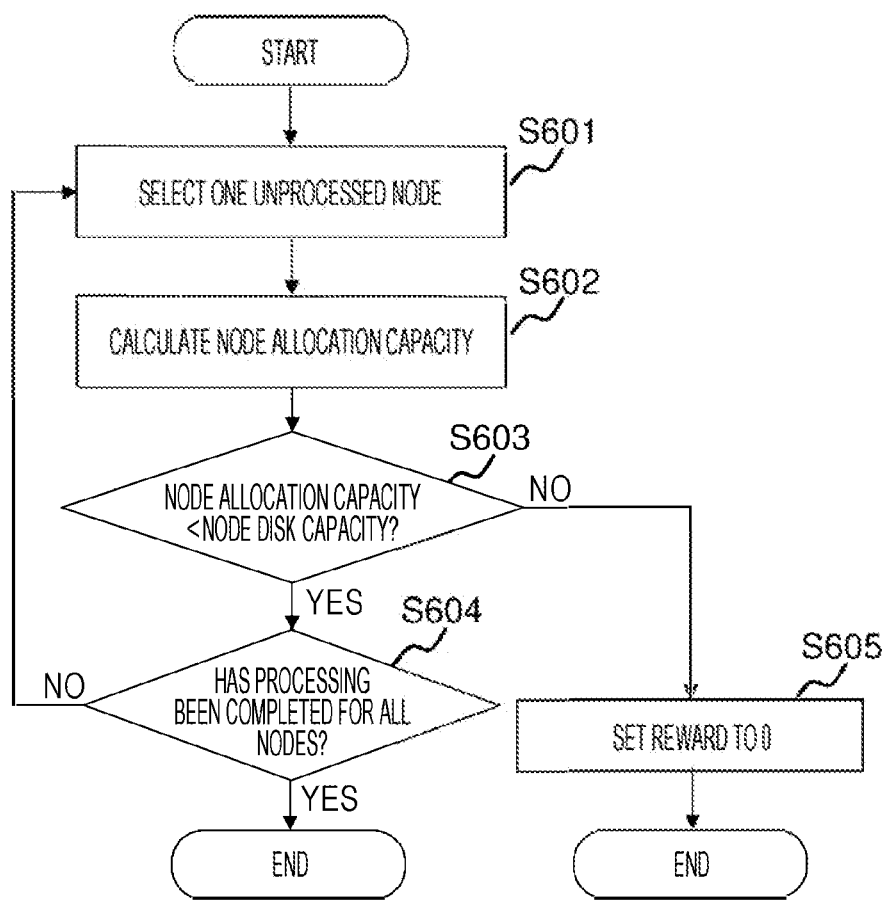
FIG. 20 illustrates reward calculation processing (node layout capacity estimation)

FIG. 19 illustrates an example of the data layout estimation (1011-5). First, the reinforcement learning training environment 1011 acquires a node configuration from the state and determines whether the number of nodes in the node configuration is 0 (S501). In a case where the number of nodes is 0 (S501: Yes), it is determined that the data layout is not allowed, the reward is set to 0, and the processing ends (S511). In this case, next reward calculation processing (1011-6) is also skipped, and the reward 1013 is output as 0.

In a case where the number of nodes is 1 or more (S501: No), next, virtual regions by the number of nodes are generated on the computer or system that executes the reinforcement learning training module 101 (S502). The following processing in S503 to S510 is processing performed on all the tables one by one. Therefore, first, one unprocessed table is selected (S503). Next, sample data 110 of the selected table is read (S504). Then, the distribution key is acquired from the state, and sample data is allocated to a virtual region for each node according to the distribution key (S505). In a case where there is no distribution key, the sample data is allocated to the virtual regions in the nodes in a round robin manner (S506). In a case where the distribution key is set to other than "all", a hash of a value of the distribution key is acquired for each column data of each sample data, and is allocated to a virtual region in a node according to the value of the hash (S507). In a case where the distribution key is set to "all", all the data is allocated to the virtual regions in all the nodes (S508). Next, the sort key is extracted, and the sample data allocated to the virtual region in each node is sorted by the sort key. Thereafter, it is determined whether the processing has been completed for all the tables (S510), and in a case where there is an unprocessed table (S510: No), the processing from S503 is performed again on the unprocessed table.

FIGS. 20 to 23 illustrate an example of reward calculation (1011-6) processing. First, in the flow illustrated in FIG. 20, the reinforcement learning training module 101 checks capacity to be laid out in each node. The processing in S601 to S603 is processing performed on all the nodes one by one. Therefore, first, one unprocessed node is selected (S601). Next, node allocation capacity assumed to be allocated to the node is calculated from capacity of sample data allocated to the node in FIG. 19 (S602). This is calculated as (node allocation capacity)=(sample data allocation capacity)*(100/X) in a case where data of X % of the total number is extracted as sample data. X is a value determined by the flow illustrated in FIG. 18. Then, determination of Node allocation capacity<Node disk capacity is performed by using the obtained value (S603). The node disk capacity can be obtained from the node type and the node information 104. In a case where Node allocation capacity <Node disk capacity (S603: Yes), it is determined whether the processing has been completed for all the nodes (S604). Then, in a case where there is an unprocessed node (S604: No), the processing from S601 is performed again. Then, after the processing on all the nodes is completed, the processing proceeds to the flow illustrated in FIG. 21. In a case where Node allocation capacity>Node disk capacity (S603: No), the reward 1013 is set to 0, and this reward calculation processing (1011-6) is ended.

Figure 21:
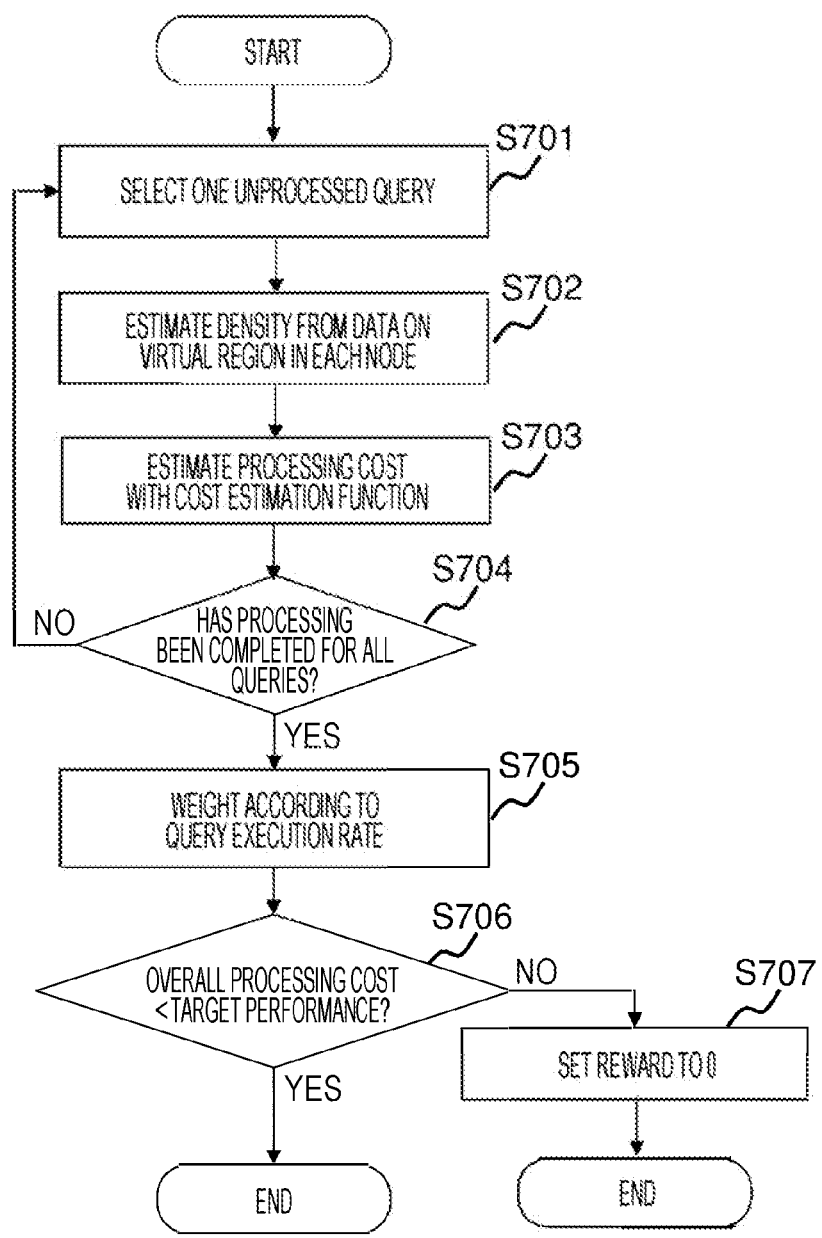
FIG. 21 illustrates reward calculation processing (overall processing cost calculation)

In the flow illustrated in FIG. 21, the processing cost of the query is estimated. The processing in S701 to S704 is processing performed on all the queries one by one. Therefore, the reinforcement learning training module 101 first selects one unprocessed query (S701). This means that one query may be selected from the query information 106. Next, density when the query is executed is calculated by using information of the sample data laid out for each virtual region in each node obtained by the flow illustrated in FIG. 19 (S702). Then, processing cost of the query is estimated by a cost estimation function of the database (S703). Processing in S702 and S703 can be implemented by a general database processing function.

Then, it is checked whether the processing cost has been calculated for all the queries (S704), and in a case where there is an unprocessed query (S704: No), the processing from S701 is performed again. After the processing cost has been calculated for all the queries (S704: Yes), query execution time is weighted, and an entire processing cost is calculated (S705). This can be calculated, for example, by multiplying a simple query execution cost by a weight of the execution rate indicated in the query information 106. In other words, where a cost of a query 1 is C1, an execution rate of the query 1 is 0.4, a cost of a query 2 is C2, and an execution rate of the query 2 is 0.6, C1*0.4+C2*0.6 can be calculated. Finally, the overall processing cost calculated in this manner is compared with the target performance (S706). The processing cost corresponds to the query execution time. In a case where the processing cost exceeds the target performance (S706: No), the reward 1013 is set to 0 (S707), and this reward calculation processing (1011-6) is ended. In a case where the overall processing cost is lower than the target performance 102 (S706: Yes), the processing proceeds to the processing illustrated in FIG. 22.

Figure 22:
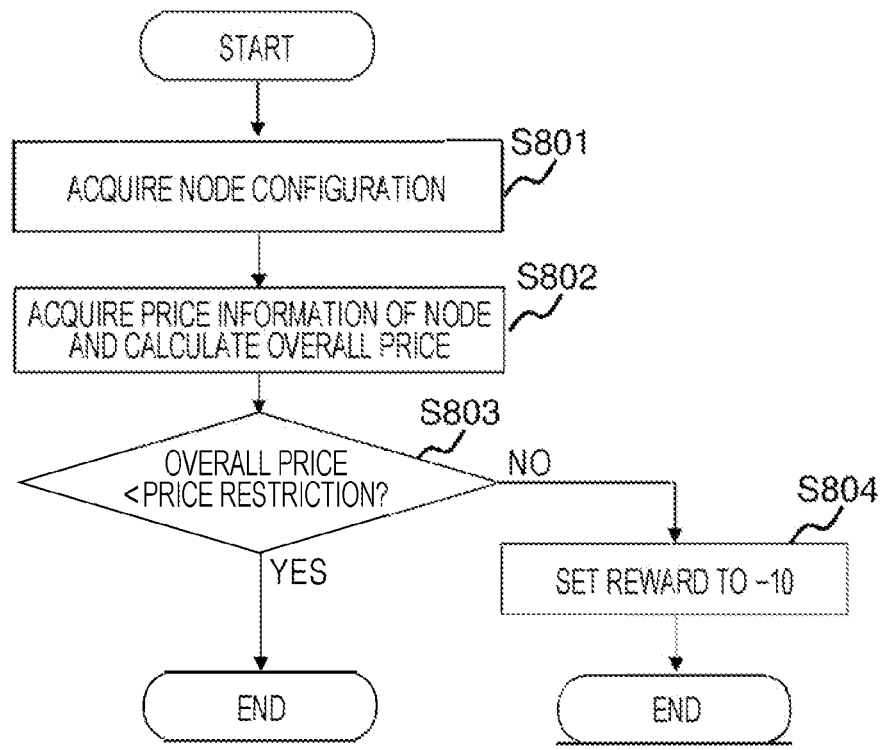
FIG. 22 illustrates reward calculation processing (overall price calculation)

FIG. 22 is processing of calculating a price corresponding to the node configuration. The reinforcement learning training module 101 first acquires a node configuration from the state (S801). Next, the overall price corresponding to the current node configuration is calculated together with the node information 104 (S802). Then, the overall price is compared with the price restriction 103 (S803). In a case where the overall price exceeds the price restriction (S803: No), the reward 1013 is set to −10 (S804), and this reward calculation processing (1011-6) is ended. In a case where the overall price is lower than the price restriction (S803: Yes), the processing proceeds to the processing illustrated in FIG. 23.

Figure 23:
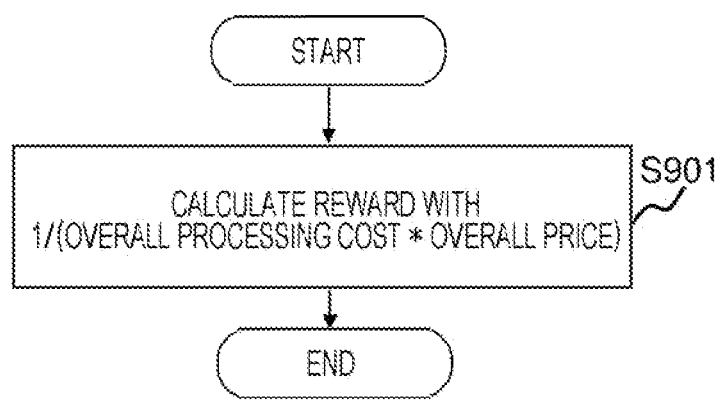
FIG. 23 illustrates reward calculation processing (reward calculation)

FIG. 23 illustrates processing of calculating the reward 1013 from the overall processing cost and the overall price. For example, the reinforcement learning training module 101 calculates the reward 1013 with 1/(Overall processing cost*Overall price) (S901).

Figure 24:
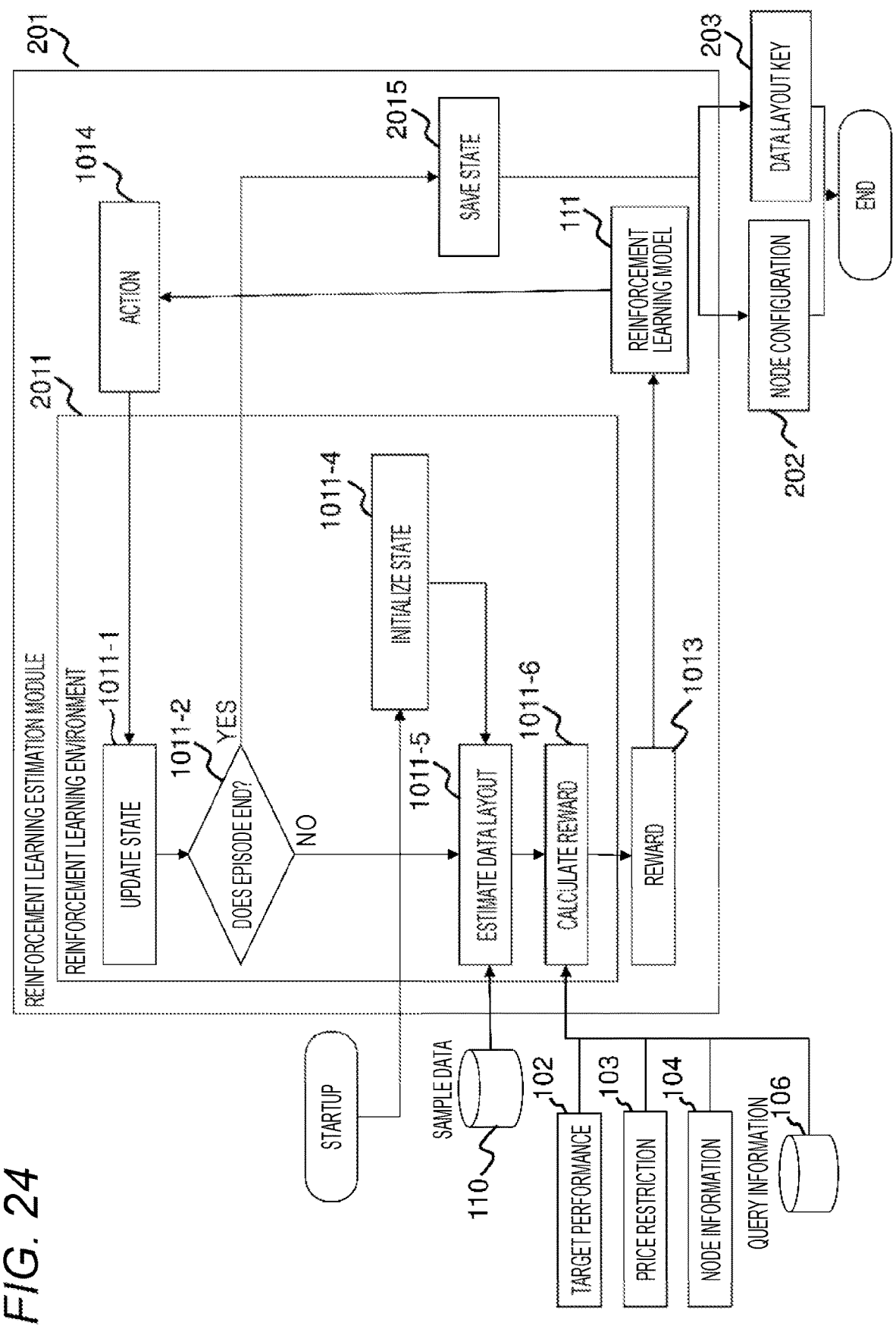
FIG. 24 is an overall processing flowchart of estimation processing in the first embodiment.

FIG. 24 is an overall processing flowchart of the reinforcement learning estimation module 201. This processing flow is a flow of outputting an optimum node configuration 202 and an optimum data layout key 203 by using the reinforcement learning model 111 output from the reinforcement learning training module. In this processing, input and processing modules similar to input and processing modules used for many reinforcement learning training modules 101 are used. The reinforcement learning estimation module 201 includes a reinforcement learning estimation environment 2011 and a reinforcement learning model 111. The reinforcement learning estimation environment 2011 internally has a state and calculates a reward 1013 according to the state. The state includes a node configuration 202 and data layout keys 203 (The node configuration 202 and the data layout keys 203 illustrated in FIG. 2 are obtained by outputting this state to outside.). The reward 1013 is input to the reinforcement learning model 111, and the reinforcement learning model 111 calculates the action 1014. The action 1014 is input to the reinforcement learning estimation environment 2011, and the reinforcement learning estimation environment 2011 updates the internal state according to the input action 1014 and newly calculates the reward 1013.

Figure 25:
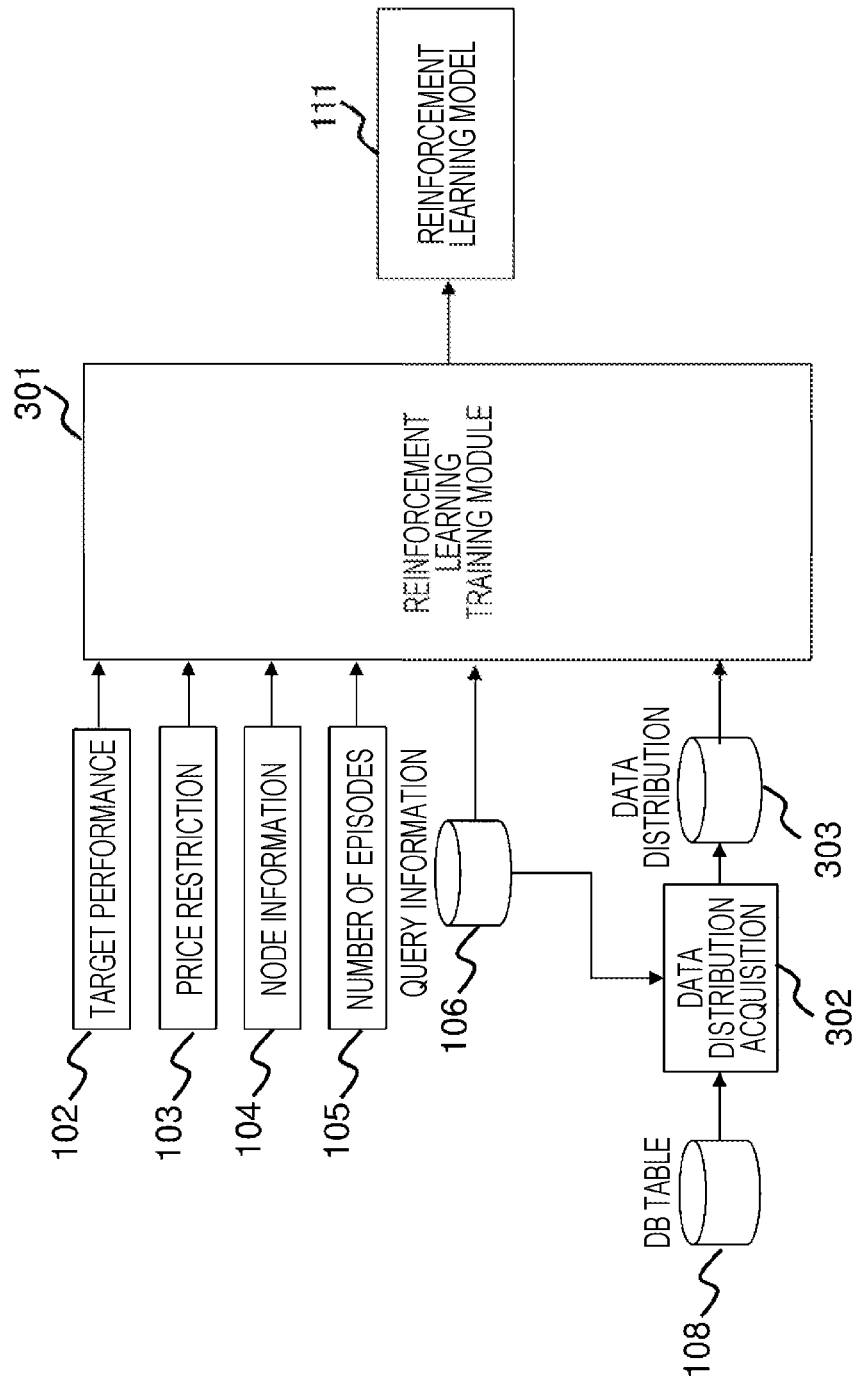
FIG. 25 is an overall configuration diagram of a model training configuration of a reinforcement learning system according to a second embodiment.

Detailed operation of the reinforcement learning estimation environment 2011 is as follows. First, upon receiving the action 1014, the reinforcement learning estimation environment 2011 internally updates a state (1011-1) and then determines whether to end the episode of the reinforcement learning (1011-2). In a case where it is determined to end the episode of the reinforcement learning, the internal states are saved (2015). At this time, the node configuration 202 and the data layout key 203 are saved and output. In a case where it is determined not to end the episode of the reinforcement learning, data layout estimation processing is performed (1011-5). Then, the query cost is calculated on the basis of the data layout (1011-6), and the reward 1013 is calculated on the basis of the result. When starting the estimation of the reinforcement learning, the processing is started from the state initialization 1011-4. The elements of each processing in FIG. 25 are similar to the elements in each processing illustrated in FIG. 2. The differences are that the number of episodes ends at one, and the node configuration 202 and the data layout key 203 are saved as internal states instead of saving the model at the end, and that the reinforcement learning model 111 calculates the action 1014 from the reward 1013. The node configuration 202 and the data layout key 203 output here are outputs required by this system, and a database administrator or the like actually lay outs the data in the distributed parallel database on the basis of the outputs. In addition, it is also possible by the system to automatically change the data layout for the distributed parallel database on the basis of this output. Note that the reinforcement learning model 111 is a model generated by reinforcement learning. The reinforcement learning model generally includes an interface having the reward 1013 as an input and the action 1014 as an output.

As described above, in the present embodiment, the data layout is estimated from the sample data, the node configuration, and the layout key, and the node configuration and the layout key obtained from the action subjected to the reinforcement learning on the basis of the reward obtained from the data layout are output and updated. For example, a data layout model generation system, which generates, with reinforcement learning, a node configuration and a data layout key in a distributed parallel database, includes a sample acquisition processor (for example, the sample acquisition processor 109) that acquires, on the basis of a predetermined acquisition method, sample data from data stored in the distributed parallel database (for example, the sample acquisition method 107 illustrated in FIG. 8), a data layout estimator (for example, a processor that performs data layout estimation processing of a reinforcement learning training environment 1011) having, as states in the reinforcement learning, the node configuration (for example, the node information 104 illustrated in FIG. 5 or the node configuration 202 illustrated in FIG. 9) and the data layout key (for example, the data layout key 203 illustrated in FIG. 10) including information regarding an order of sorting columns that constitute the data and information regarding a method for distribution between nodes, the data layout estimator estimating layout of the data on the basis of the state and the sample data, a reward calculator (for example, a processor that performs reward calculation processing of the reinforcement learning training environment 1011) that calculates a reward in the reinforcement learning on the basis of a result obtained by estimating the layout of the data, the node configuration, and a processing cost of a query executed on the distributed parallel database, a reinforcement learner (for example, the reinforcement learning agent 1012) that outputs, according to the calculated reward, the node configuration and the data layout key that are subjected to reinforcement learning as an action, and a state updater (for example, a processor that performs state update processing of the reinforcement learning training environment 1011) that updates, as a new state, the node configuration and the data layout key that are output as the action. Therefore, a model that optimizes a physical data design and a node design in the distributed parallel database can be automatically configured by the reinforcement learning, and a work cost incurred by the database administrator can be reduced while maximizing cost performance of the entire system.

Furthermore, as described with reference to FIGS. 10, 19, and the like, the data layout estimator allocates the data to the nodes in a round robin manner in a case where the distribution key is not set for the data layout key, allocates the data to a node on the basis of the hash value of the distribution key in a case where a distribution key is set for the data layout key, and copies the data and allocates the data to all the nodes in a case where the distribution key is set and the distribution key indicates all the nodes. Therefore, the data in the distributed parallel database can be flexibly allocated to the nodes according to a setting status of the distribution key.

In addition, as described with reference to FIGS. 21, 22, and the like, the reward calculator receives input of information regarding the target performance of the distributed parallel database or node price restriction, sets the reward low in a case where the processing cost of the query does not satisfy the target performance, and sets the reward to negative in a case where a price for the nodes does not satisfy the price restriction. Therefore, the reward can be appropriately set according to the target performance of the distributed parallel database or the node price restriction.

Furthermore, the reward calculator can set the reward by using the processing cost of the query weighted on the basis of an execution rate indicating execution frequency of the predetermined query. Therefore, it is possible to appropriately set the reward in consideration of the query execution frequency.

Furthermore, the reward calculator can calculate the execution rate by analyzing a query execution log, and set the reward by using the processing cost of the query weighted on the basis of the calculated execution rate. Therefore, even in a case where the query execution frequency is not known in advance, it is possible to appropriately set the reward in consideration of the actual query execution frequency.

Second Embodiment

Hereinafter, a physical data layout and a node configuration automatic optimization system according to a second embodiment will be described with reference to FIGS. 25 to 31. In the second embodiment, similarly to the first embodiment, first, the reinforcement learning system trains a machine learning model on the basis of inputs of a target performance, a price restriction, node information, query information, a database, and the like. Thereafter, an optimum physical data layout and node configuration are estimated by using the created reinforcement learning model. The difference from the first embodiment is that, when a reward 1013 is calculated, a sample data 110 is used in the first embodiment, whereas a data distribution 303 is used in the second embodiment.

FIG. 25 is an overall configuration diagram of model creation processing at a time of training according to the second embodiment. A reinforcement learning training module 301 receives a target performance 102, a price restriction 103, node information 104, the number of episodes 105, query information 106, and the data distribution 303 as input, and outputs a reinforcement learning model 111. The data distribution 303 is calculated by a data distribution acquisition processor 302 performing processing from a DB table 108 and the query information 106. The difference from FIG. 1 in the first embodiment is only the data distribution acquisition processor 302 and the data distribution 303.

Figure 26:
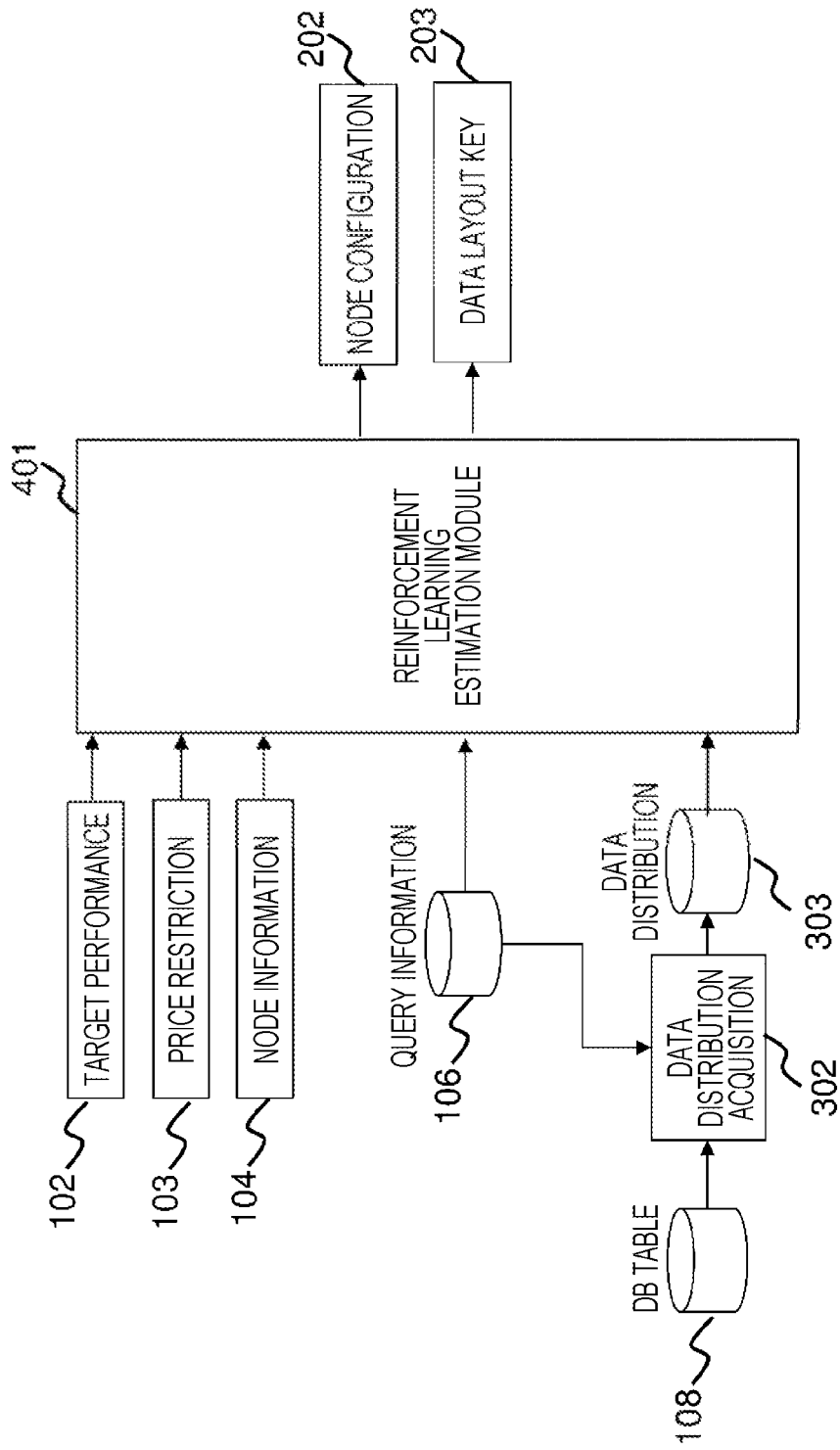
FIG. 26 is an overall configuration diagram of an estimation configuration of the reinforcement learning system according to the second embodiment.

FIG. 26 is an overall configuration diagram of estimation processing according to the second embodiment. This system uses substantially similar common input to input in the system at a time of reinforcement learning training illustrated in FIG. 25. That is, a reinforcement learning estimation module 401 receives the target performance 102, the price restriction 103, the node information 104, the query information 106, and the data distribution 303 as input. The data distribution 303 is calculated by the data distribution acquisition processor 302 performing processing from the DB table 108 and the query information 106. Furthermore, a reinforcement learning estimation module 401 outputs a node configuration 202 and a data layout key 203. The difference from FIG. 2 in the first embodiment is only the data distribution acquisition processor 302 and the data distribution 303 similarly to the difference between FIG. 1 in the first embodiment and FIG. 25.

Figure 27:
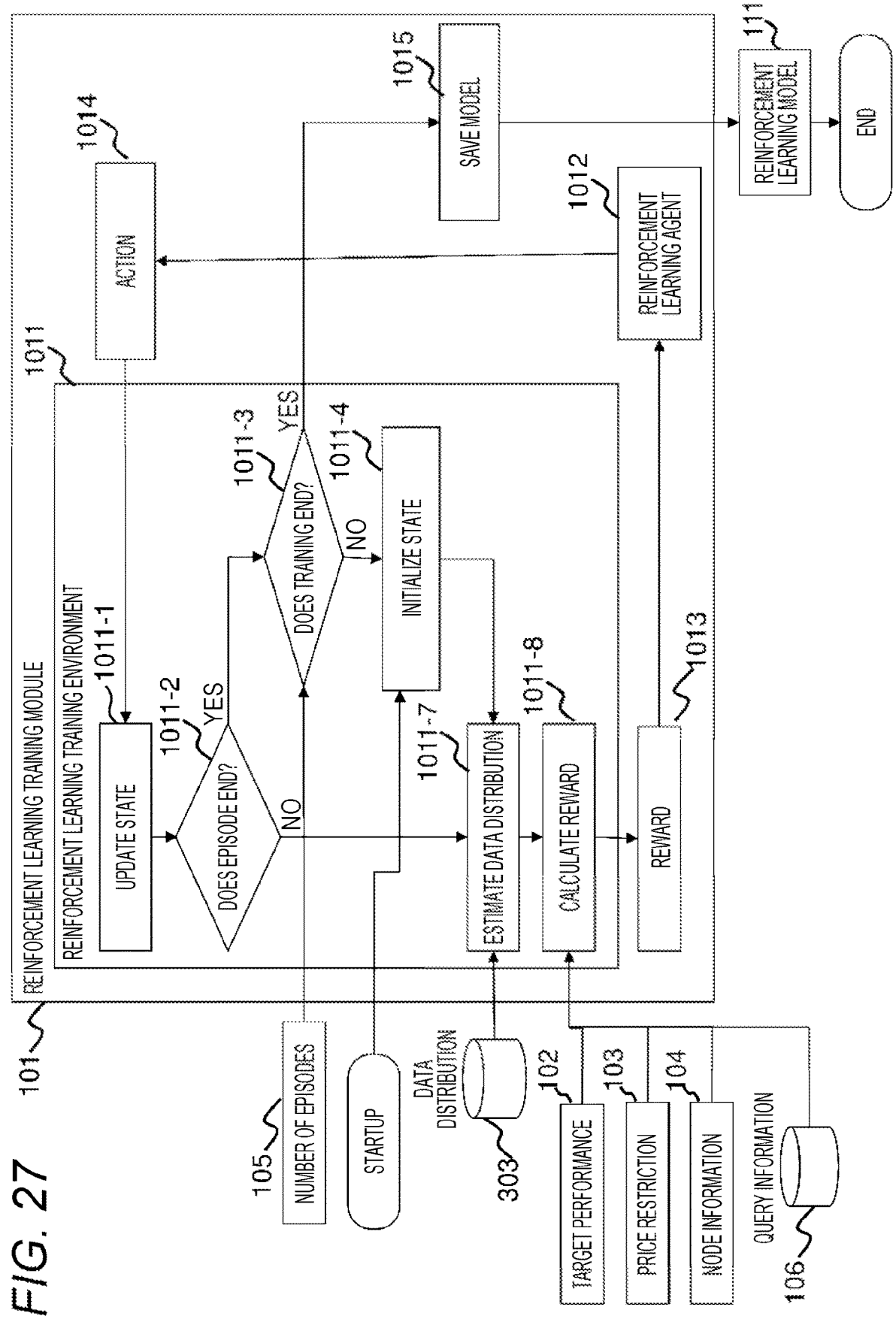
FIG. 27 is an overall processing flowchart at a time of model training in the second embodiment.

FIG. 27 is an overall processing flowchart of the reinforcement learning training module 101. The difference from FIG. 11 is that the data distribution 303 is used instead of the sample data 110, and accordingly, the data layout estimation 1011-5 is replaced with a data distribution estimation processing 1011-7, and the reward calculation 1011-6 is replaced with reward calculation 1011-8 based on a data distribution. Other modules and an entire processing flow are similar to those illustrated in FIG. 11 in the first embodiment.

Figure 28:
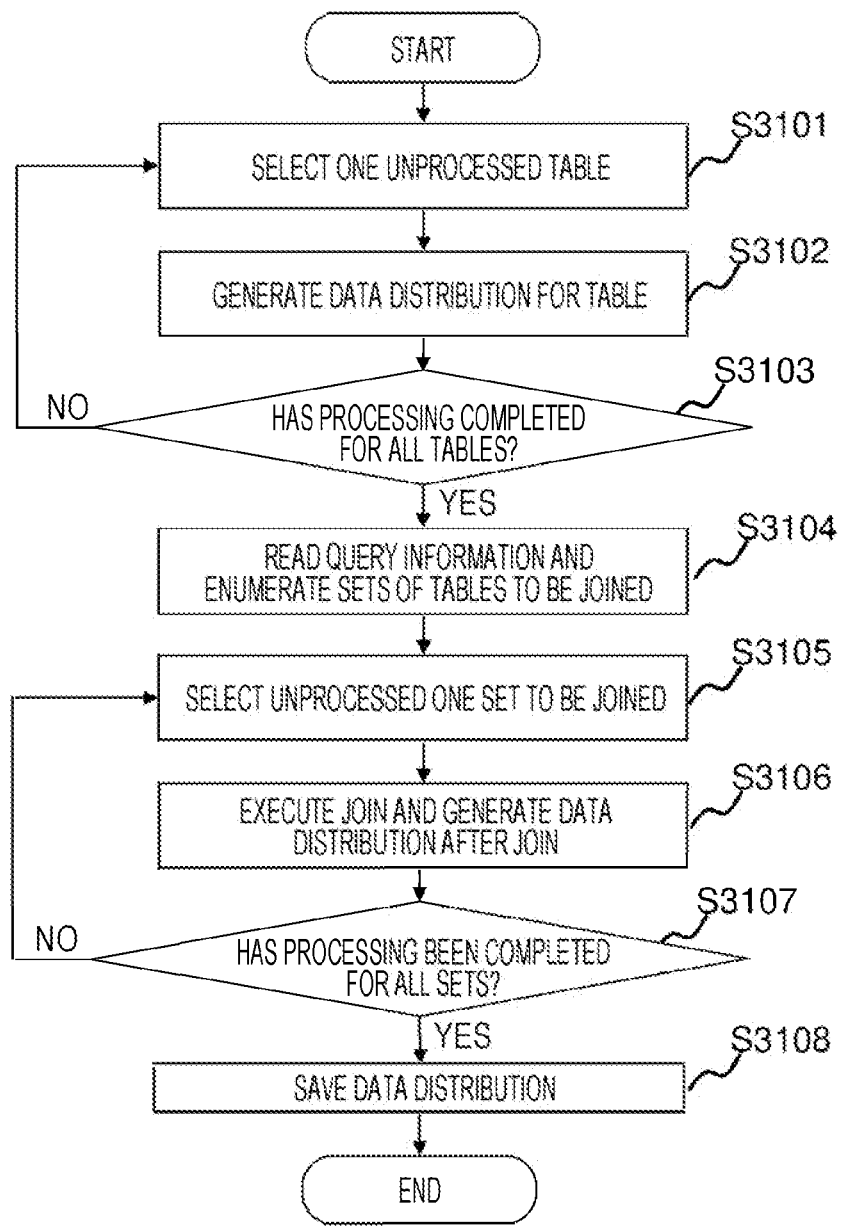
FIG. 28 illustrates data distribution calculation processing.

FIG. 28 illustrates an example of processing performed by the data distribution acquisition processor 302. The data distribution indicates general data distribution in the database, and corresponds to, for example, a frequency histogram for each item, the histogram indicating how many items exist for each value in each column, or a histogram for each range, the histogram indicating how many data are included in a certain section of each column. In this processing, first, a data distribution for each table is created. For this purpose, first, the data distribution acquisition processor 302 selects one unprocessed table (S3101). Next, a data distribution for the table is generated (S3102). In this processing, data distribution generation processing in a conventionally known normal database is used. Then, it is checked whether calculation of a data distribution has been completed for all the tables (S3103), and in a case where there is an unprocessed table (S3103: No), the processing from S3101 is executed again. After acquisition of data distribution for all the tables is completed (S3103: Yes), the query information 106 is read, and sets of tables to be joined are enumerated (S3104).

Then, one set to be joined is selected (S3105), and the set is actually joined to generate a data distribution after the join (S3106). This is repeated for all the sets to be joined (S3107). In S3104, all the join processing included in the query is enumerated first, and then an order of all the joins is enumerated. For example, in a case where tables A, B, and C are joined, there are conceivable cases where A and B are first joined and then joined with C, B and C are first joined and then joined with A, C and A are joined and then joined with B, and all of these possible cases are enumerated. In the processing in S3105 to S3107, one set to be joined that is enumerated in S3104 is extracted, and a data distribution after the join processing is performed is generated. For example, A and B are joined, and a data distribution of the joined tables is generated. Next, A and B are joined, and then C is joined. Then, a data distribution for the completed table obtained as a result is also generated. Finally, information of all the completed data distributions obtained is saved (S3108).

Figure 29:
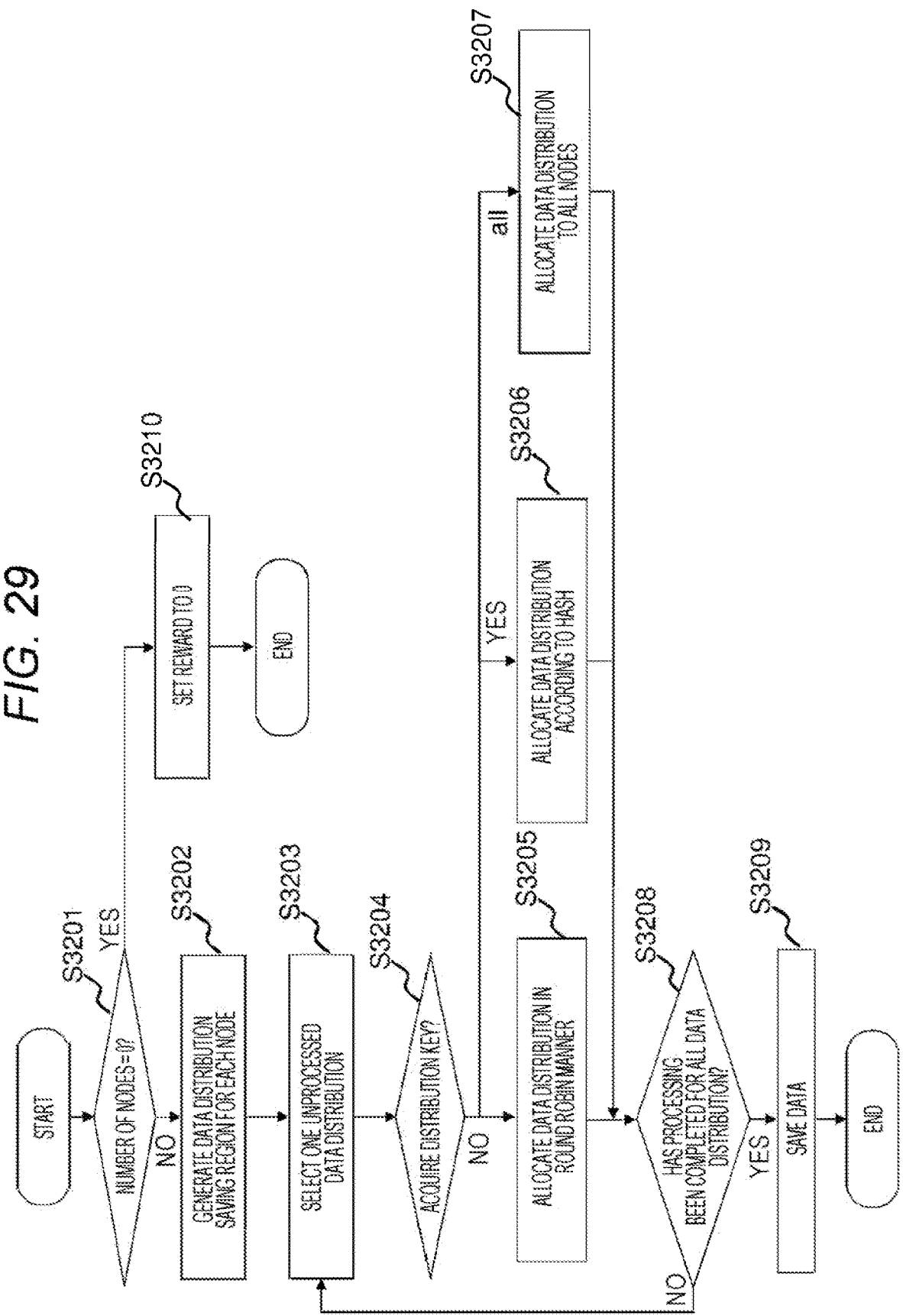
FIG. 29 illustrates data distribution estimation processing.

FIG. 29 illustrates an example of processing of data distribution estimation (1011-7). First, a node configuration is acquired from the state and it is determined whether the number of nodes in the node configuration is 0 (S3201). In a case where the number of nodes is 0 (S3201: Yes), it is determined that the data layout is not allowed, the reward is set to 0, and the processing ends (S3210). In this case, next reward calculation processing (1011-8) is also skipped, and the reward 1013 is output as 0.

In a case where the number of nodes is 1 or more (S3201: No), next, a virtual region (data distribution saving region) for saving a data distribution for each node is generated on the computer or system that executes the reinforcement learning training module 101 (S3202). The following processing in S3203 to S3208 is processing performed on all the data distributions one by one. Therefore, first, one unprocessed data distribution is selected (S3203). Next, a distribution key of a table subjected to the selected data distribution is acquired from the state (S3204). The following is done for a data distribution of a result of joining a plurality of tables. First, in a case where only one table has a distribution key, the distribution key is extracted. In a case where a plurality of tables has a distribution key, one distribution key is randomly selected. In a case where all the tables do not include a distribution key, if the distribution keys of all the tables are "all", the distribution keys are set as "all". In a case where all the tables do not include the distribution key and there is no distribution key of one or more tables, no distribution keys are set. Allocation of data distribution to each node is performed according to the obtained distribution key.

First, in a case where there is no distribution key, the data distribution is allocated to each node in a round robin manner (S3205). For example, in a case where the data distribution is a frequency histogram, the frequency is equally allocated to each node. In a case where the data distribution is a histogram for each range, the histogram is allocated to each node in a round robin manner for each range. Next, in a case where there is a distribution key, data distribution is distributed on the basis of a hash (S3206). For example, in a case where the data distribution is a frequency histogram, allocation to nodes is performed according to a hash of each value. In a case where the data distribution is a histogram for each range, the data distribution is allocated to the node for each certain range according to a hash of a value of a start of the range. Finally, in a case where the distribution key is "all", the data distribution is allocated to all the nodes (S3207). Then, it is checked whether the processing has been completed for all the data distributions (S3208), and in a case where there is an unprocessed data distribution (S3208: No), the processing from S3203 is performed again. After the processing is completed for all the data distributions (S3208: Yes), information of data distribution of each node is saved (S3209).

Reward calculation (1101-8) in the second embodiment is similar in many parts to the reward calculation in the first embodiment. The reward calculation processing (1101-6) is illustrated in FIGS. 20 to 23 in the first embodiment. Reward calculation processing in the second embodiment is obtained by replacing the processing FIG. 21 in the first embodiment with the processing in FIG. 30.

Figure 30:
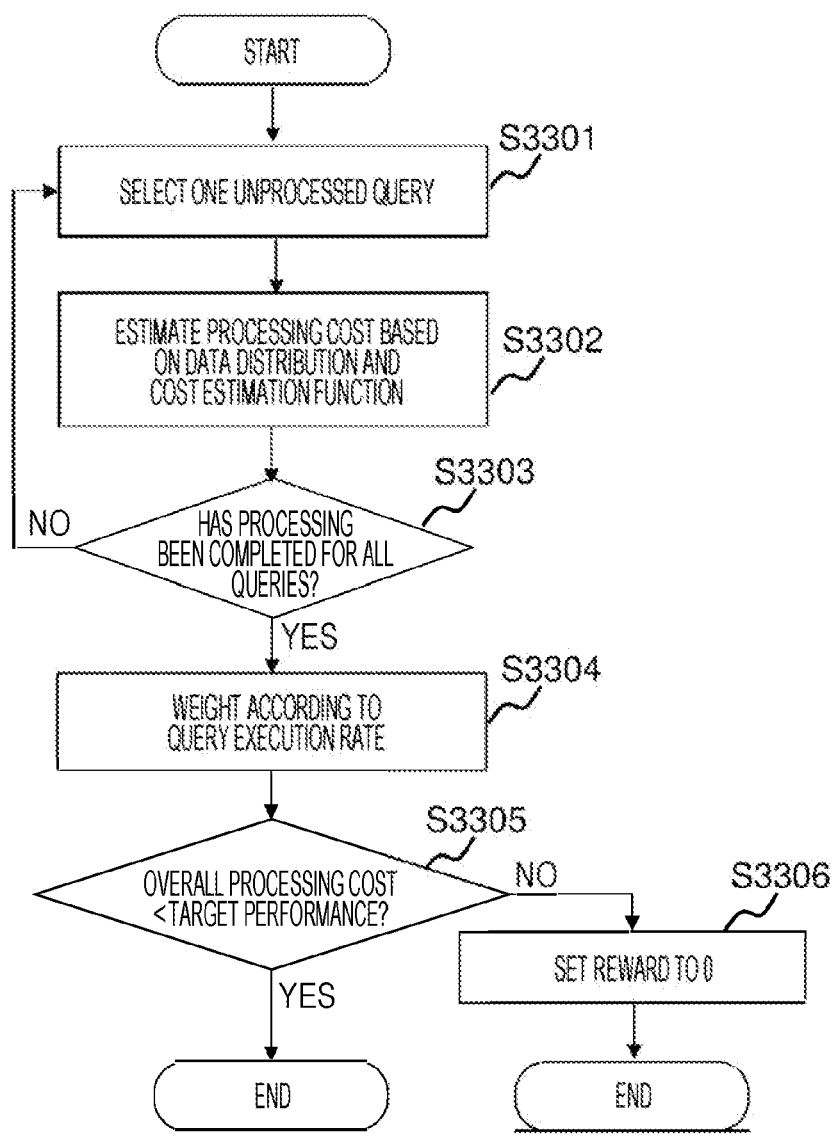
FIG. 30 illustrates reward calculation processing (overall processing cost calculation) in the second embodiment.

In the flow illustrated in FIG. 30, the processing cost of the query is estimated. The processing in S3301 to S3303 is processing performed on all the queries one by one. Therefore, the reinforcement learning training module 101 first selects one unprocessed query (S3301). This means that one query may be selected from the query information 106. Next, the query cost is calculated on the basis of the data distribution of each node, the data distribution being obtained by the flow illustrated in FIG. 29. Here, a cost estimation function based on the data distribution that a general database engine has is utilized as is (S3302). Then, it is checked whether the processing cost has been calculated for all the queries (S3303), and in a case where there is an unprocessed query (S3303: No), the processing from S3301 is performed again. After the processing cost has been calculated for all the queries (S3303: Yes), query execution time is weighted, and an entire processing cost is calculated (S3304). Similarly to the case of the first embodiment, this can be calculated, for example, by multiplying a simple query execution cost by a weight of the execution rate indicated in the query information 106. Finally, the overall processing cost calculated in this manner is compared with the target performance (S3305). The processing cost corresponds to the query execution time. In a case where the processing cost exceeds the target performance (S3305: No), the reward 1013 is set to 0, and this reward calculation processing (1011-8) is ended. In a case where the overall processing cost is lower than the target performance 102 (S3305: Yes), the processing proceeds to the processing illustrated in FIG. 22.

Figure 31:
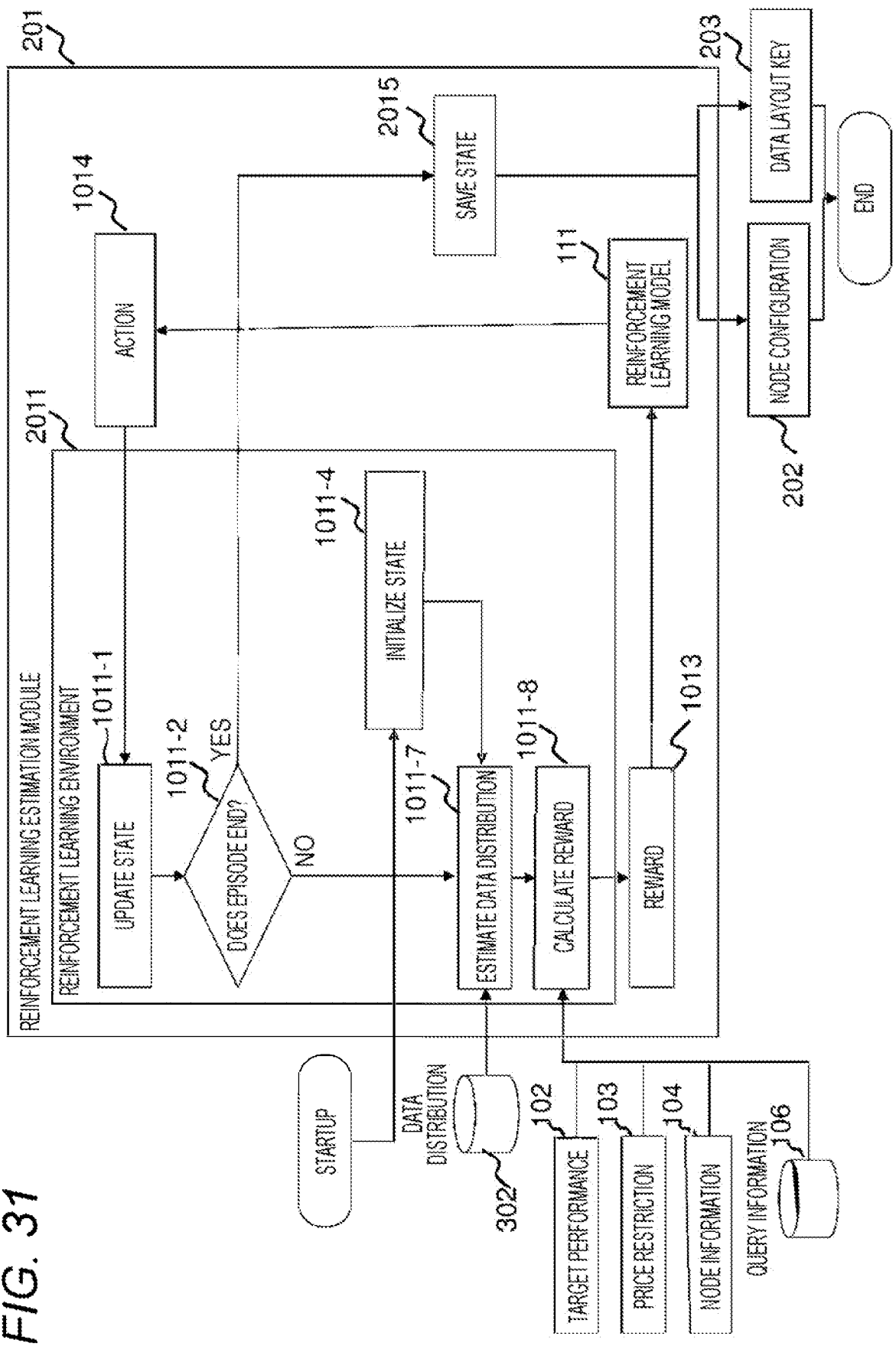
FIG. 31 is an overall processing flowchart of estimation processing in the second embodiment.

FIG. 31 is an overall processing flowchart of the reinforcement learning estimation module 401. Similarly to the reinforcement learning estimation module 201 in the first embodiment, this processing flow is a flow of outputting an optimum node configuration 202 and an optimum data layout key 203 by using the reinforcement learning model 111 output from the reinforcement learning training module. The data distribution 303, the data distribution estimation 1011-7, and the reward calculation 1011-8 in this flow are similar to the processing illustrated in FIG. 27, and other processing and an overall processing flow are similar to the processing in a known example 1 illustrated in FIG. 24. With this processing, a target node configuration 202 and data layout key 203 can be obtained.

As described above, in the present embodiment, as described with reference to FIGS. 27 to 29 and the like, a data layout model generation system, which generates, with reinforcement learning, a node configuration and a data layout key in a distributed parallel database, includes a data distribution acquirer (for example, a data distribution acquisition processor 302) that acquires, on the basis of data stored in the distributed parallel database and a query (for example, the query information 106 illustrated in FIG. 7) executed on the distributed parallel database, data distribution of each table and data distribution of tables joined by the query, a data layout estimator (for example, a processor that performs data layout estimation processing of a reinforcement learning training environment 1011) having, as states in the reinforcement learning, the node configuration (for example, the node information 104 illustrated in FIG. 5 or the node configuration 202 illustrated in FIG. 9) and the data layout key (for example, the data layout key 203 illustrated in FIG. 10) including information regarding an order of sorting columns that constitute the data and information regarding a method for distribution between nodes, the data layout estimator estimating layout of the data on the basis of the state and the data distribution, a reward calculator (for example, a processor that performs reward calculation processing of the reinforcement learning training environment 1011) that calculates a reward in the reinforcement learning on the basis of a result obtained by estimating the layout of the data, the node configuration, and a processing cost of a query executed on the distributed parallel database, a reinforcement learner (for example, the reinforcement learning agent 1012) that outputs, according to the calculated reward, the node configuration and the data layout key that are subjected to reinforcement learning as an action, and a state updater (for example, a processor that performs state update processing of the reinforcement learning training environment 1011) that updates, as a new state, the node configuration and the data layout key that are output as the action. Therefore, even in a case where the data distribution 303 is used instead of sample data, an effect similar to an effect obtained in the first embodiment can be obtained.

Furthermore, as described with reference to FIG. 29 and the like, the data layout estimator allocates the data to the nodes in a round robin manner in a case where the distribution key is not set for the data layout key, allocates the data to a node on the basis of the hash value of the distribution key in a case where a distribution key is set for the data layout key, and copies the data and allocates the data to all the nodes in a case where the distribution key is set and the distribution key indicates all the nodes. Therefore, similarly to the case of the first embodiment, the data in the distributed parallel database can be flexibly allocated to the nodes according to a setting status of the distribution key.

In addition, as described with reference to FIG. 30 and the like, the reward calculator receives input of information regarding the target performance of the distributed parallel database or node price restriction, sets the reward low in a case where the processing cost of the query does not satisfy the target performance, and sets the reward to negative in a case where a price for the nodes does not satisfy the price restriction. Therefore, similarly to the case of the first embodiment, the reward can be appropriately set according to the target performance of the distributed parallel database or the node price restriction.

Furthermore, the reward calculator can set the reward by using the processing cost of the query weighted on the basis of an execution rate indicating execution frequency of the predetermined query. Therefore, similarly to the case of the first embodiment, it is possible to appropriately set the reward in consideration of the query execution frequency.

Furthermore, the reward calculator can calculate the execution rate by analyzing a query execution log, and set the reward by using the processing cost of the query weighted on the basis of the calculated execution rate. Therefore, similarly to the case of the first embodiment, even in a case where the query execution frequency is not known in advance, it is possible to appropriately set the reward in consideration of the actual query execution frequency.

Although the embodiments of the present invention have been described above, the present invention is not limited to the exemplified embodiments, and various modifications and combinations can be made without departing from the gist of the invention. For example, the description of the embodiments, which has been provided above in detail, is intended to describe the present invention in an easily understandable manner and accordingly, the above-described embodiments are not necessarily limited to the one that includes all the configurations described above. Furthermore, it is also possible to replace a part of the configuration of an embodiment with the configuration of another embodiment, and also possible to add, to the configuration of an embodiment, the configuration of another embodiment. Furthermore, it is also possible to add another configuration to a part of the configuration of each embodiment, delete a part of the configuration of each embodiment, and replace a part of the configuration of each embodiment with another configuration.

What is claimed is:

1. A data layout model generation system that generates, with reinforcement learning, a node configuration and a data layout key in a distributed parallel database, the data layout model generation system comprising:
    a hardware processor that acquires, on the basis of a predetermined acquisition method, sample data from data stored in the distributed parallel database;
    a non-transitory computer-readable storage medium operatively coupled with the hardware processor, and storing program instructions executed by the hardware processor that cause the data layout model generation system to:
    estimate layout of the data on the basis of the sample data and states in the reinforcement learning, the states including the node configuration and the data layout key including information regarding an order of sorting columns that constitute the data and information regarding a method for distribution between nodes;
    calculate a reward in the reinforcement learning on the basis of a result obtained by estimating the layout of the data, the node configuration, and a processing cost of a query executed on the distributed parallel database;
    output, according to the calculated reward, the node configuration and the data layout key that are subjected to reinforcement learning as an action; and
    update, as a new state, the node configuration and the data layout key that are output as the action.

2. The data layout model generation system according to claim 1, wherein
    the hardware processor allocates the data to nodes in a round robin manner in a case where a distribution key is not set for the data layout key, allocates the data to a node on the basis of a hash value of the distribution key in a case where the distribution key is set for the data layout key, and copies the data and allocates the data to all the nodes in a case where the distribution key is set and the distribution key indicates all the nodes.

3. The data layout model generation system according to claim 1, wherein
    the hardware processor
    receives input of information regarding target performance of a distributed parallel database or node price restriction, and
    sets the reward low in a case where the processing cost of the query does not satisfy the target performance, and sets the reward to negative in a case where a price for the nodes does not satisfy the price restriction.

4. The data layout model generation system according to claim 3, wherein
    the hardware processor sets the reward by using the processing cost of the query weighted on the basis of an execution rate indicating execution frequency of the predetermined query.

5. The data layout model generation system according to claim 4, wherein
    the hardware processor calculates the execution rate by analyzing a query execution log, and sets the reward by using the processing cost of the query weighted on the basis of the calculated execution rate.

6. A data layout model generation system that generates, with reinforcement learning, a node configuration and a data layout key in a distributed parallel database, the data layout model generation system comprising:
    a hardware processor that acquires, on the basis of data stored in the distributed parallel database and a query executed on the distributed parallel database, data distribution of each table and data distribution of tables joined by the query;
    a non-transitory computer-readable storage medium operatively coupled with the hardware processor, and storing program instructions executed by the hardware processor that cause the data layout model generation system to:
    estimate layout of the data on the basis of the data distribution and states in the reinforcement learning, the states including the node configuration and the data layout key including information regarding an order of sorting columns that constitute the data and information regarding a method for distribution between nodes;
    calculate a reward in the reinforcement learning on the basis of a result obtained by estimating the layout of the data, the node configuration, and a processing cost of a query executed on the distributed parallel database;
    output, according to the calculated reward, the node configuration and the data layout key that are subjected to reinforcement learning as an action; and
    update, as a new state, the node configuration and the data layout key that are output as the action.

7. The data layout model generation system according to claim 6, wherein
    the hardware processor allocates the data to nodes in a round robin manner in a case where a distribution key is not set for the data layout key, allocates the data to a node on the basis of a hash value of the distribution key in a case where the distribution key is set for the data layout key, and copies the data and allocates the data to all the nodes in a case where the distribution key is set and the distribution key indicates all the nodes.

8. The data layout model generation system according to claim 6, wherein
    the hardware processor
    receives input of information regarding target performance of a distributed parallel database or node price restriction, and
    sets the reward low in a case where the processing cost of the query does not satisfy the target performance, and sets the reward to negative in a case where a price for the nodes does not satisfy the price restriction.

9. The data layout model generation system according to claim 8, wherein
    the hardware processor sets the reward by using the processing cost of the query weighted on the basis of an execution rate indicating execution frequency of the predetermined query.

10. The data layout model generation system according to claim 9, wherein the hardware processor calculates the execution rate by analyzing a query execution log, and sets the reward by using the processing cost of the query weighted on the basis of the calculated execution rate.

* * * * *